United States Patent
Qiao et al.

(10) Patent No.: US 8,422,103 B2
(45) Date of Patent: Apr. 16, 2013

(54) OPTIMIZATION OF GRAY COMPONENT REPLACEMENT

(75) Inventors: Yue Qiao, Longmont, CO (US); Nenad Rijavec, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 945 days.

(21) Appl. No.: 12/342,331

(22) Filed: Dec. 23, 2008

(65) Prior Publication Data

US 2010/0157372 A1     Jun. 24, 2010

(51) Int. Cl.
 G03F 3/08     (2006.01)

(52) U.S. Cl.
 USPC .......... 358/523; 358/1.9; 358/3.26; 358/518; 358/520; 358/521; 358/529

(58) Field of Classification Search ................ 358/1.9, 358/518–523, 529
 See application file for complete search history.

(56) References Cited

U.S. PATENT DOCUMENTS

| | | | | |
|---|---|---|---|---|
| 5,583,666 | A | * | 12/1996 | Ellson et al. ................ 358/518 |
| 5,992,971 | A | * | 11/1999 | Takahashi et al. ............ 347/43 |
| 6,157,735 | A | * | 12/2000 | Holub .......................... 382/167 |
| 6,480,299 | B1 | | 11/2002 | Drakopoulos et al. |
| 7,019,868 | B2 | | 3/2006 | Chang et al. |
| 7,215,792 | B2 | | 5/2007 | Sharma et al. |
| 7,295,703 | B2 | * | 11/2007 | Bala et al. .................... 382/165 |
| 7,777,915 | B2 | * | 8/2010 | Kuo et al. .................... 358/1.9 |
| 7,852,535 | B2 | * | 12/2010 | Kang et al. .................. 358/529 |
| 2002/0113982 | A1 | * | 8/2002 | Chang et al. ................. 358/1.9 |
| 2005/0128491 | A1 | | 6/2005 | Kubo |
| 2005/0140997 | A1 | * | 6/2005 | Shirasawa .................... 358/1.9 |
| 2007/0153308 | A1 | | 7/2007 | Zemach et al. |
| 2007/0153340 | A1 | | 7/2007 | Itagaki et al. |
| 2007/0285694 | A1 | | 12/2007 | Horita |
| 2007/0291289 | A1 | | 12/2007 | Kuo et al. |

FOREIGN PATENT DOCUMENTS

JP     2006262367 A     3/2005

OTHER PUBLICATIONS

Qiao et al ("Developing a Computational Radial Basis Function Architecture for Nonlinear Scattered Color Data", International Conference on Digital Printing Technologies, Sep. 2006).*

Abet et al, "A Neural Network Approach for RGB to YMCK color conversion," Aug. 1994, IEEE Region 10's Ninth Annual International Conference, Theme "Frontiers of Computer Technology", vol. 1 pp. 6-9.

* cited by examiner

*Primary Examiner* — Richard Zhu

(74) *Attorney, Agent, or Firm* — Duft Bornsen & Fettig, LLP

(57) ABSTRACT

Methods and systems herein provide for color conversion. Such color conversion includes a method of optimizing gray component replacement in a color image that includes receiving a color image from an input imaging device (e.g., a digital camera, scanner, etc), determining a color gamut of an output imaging device, such as a printer, and generating a CIELab to CMY numerical model to convert the color image to a color space within the color gamut of the output imaging device. The method also includes generating a CMYK to CIELab numerical conversion model, removing a portion of CMY color values generated from the CIELab to CMY numerical conversion model, and replacing the removed portion of the CMY color values with black color values. The method also includes optimizing CMYK color values via a multidimensional optimization using the CMYK to CIELab numerical model.

9 Claims, 6 Drawing Sheets

OPTIMIZATION OF GRAY COMPONENT REPLACEMENT

BACKGROUND OF THE INVENTION

1. Field of the Invention

The invention relates to the field of printing systems, and in particular, to methods and systems for color conversions with toner/ink limitations.

2. Statement of the Problem

One concern in color printing regards the costs associated with toner/ink. While a certain amount of toner or ink is necessary for maintaining relatively high quality printing, toner and ink typically account for a substantial portion of the printing expenses. Traditionally, toner/ink has been conserved via a gray component replacement (GCR) process that includes under color removal (UCR) and under color addition (UCA) during color conversion. More specifically, GCR was the result of UCR followed by UCA.

In C, M, Y, K (cyan, magenta, yellow, and black) color printing, UCR is the process of eliminating certain amounts of cyan, magenta, and yellow that add to the dark neutral color, such as black. These colors are replaced with the less expensive black toner during the color separation process. However, black toner alone is not sufficiently dark and thus tends to produce relatively dull looking images (e.g., dark, less saturated, and hue shifted). UCA improves the relatively dull results of UCR by adding small portions of cyan, magenta, and yellow. However, the UCA process is empirical and fairly labor intensive due to the lack of a high fidelity model describing the nonlinear behavior of each toner. For example, UCA is commonly achieved by continually adding cyan, magenta, and/or yellow and printing until an esthetically pleasing image is produced.

As is evident, the GCR correction scheme based on the UCR and UCA is substantially error prone. Furthermore, the prior GCR is relatively incapable of dynamically adjusting to variations in print media that are known to cause variations in color conversions. Accordingly, there exists a need for a dynamic GCR that produces crisp bold images.

SUMMARY OF THE SOLUTION

Embodiments of the invention solve the above and other related problems with methods and associated systems by optimizing gray components in a color image. In one embodiment, a method of optimizing gray component replacement in a color image includes receiving a color image from an input imaging device, determining a color gamut of an output imaging device, generating a CIELab to CMY reverse numerical model to convert the color image to a color space within the color gamut of the output imaging device, and generating a CMYK to CIELab forward numerical conversion model. The method also includes removing a portion of CMY color values from the CMY values that are generated from the CIELab to CMY numerical conversion model, replacing the removed portion of the CMY color values with black color values, and optimizing the CMYK color values via a multidimensional optimization using the CMYK to CIELab numerical model. For example, optimizing the CMYK color values may entail computing the CMYK color values via an optimization algorithm, such as Newton's method using the CMYK to CIELab numerical model. The CIELab to CMY numerical conversion model and the CMYK to CIELab numerical model may each be generated according to a radial basis function.

In another embodiment, a system for optimizing gray component replacement in a color image includes a modeling module that is operable to receive a color image from an input imaging device, determine a color gamut of an output imaging device, generate a CIELab to CMY numerical model to convert the color image to a color space within the color gamut of the output imaging device, and generate a CMYK to CIELab numerical conversion model. The system also includes an optimization module that is operable to remove a portion of CMY color values generated from the CIELab to CMY numerical conversion model, replace the removed portion of the CMY color values with black color values, and optimize CMYK color values via a multidimensional optimization using the CMYK to CIELab numerical model.

In another embodiment, a printing system includes a printer operable to print to a tangible medium and a printer controller operable to process a print job including a color image from a host system and transfer the processed print job to the printer. The printer controller includes a modeling module that is operable to determine a color gamut of the printer, generate a CIELab to CMY numerical model to convert the color image to a color space within the color gamut of the printer, and generate a CMYK to CIELab numerical conversion model. The printer controller also includes an optimization module that is operable to remove a portion of CMY color values generated from the CIELab to CMY numerical conversion model, replace the removed portion of the CMY color values with black color values, and optimize CMYK color values via a multidimensional optimization using the CMYK to CIELab numerical model prior to printing via the printer. The optimization module is further operable to prepare the print job for printing via the printer.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-6 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
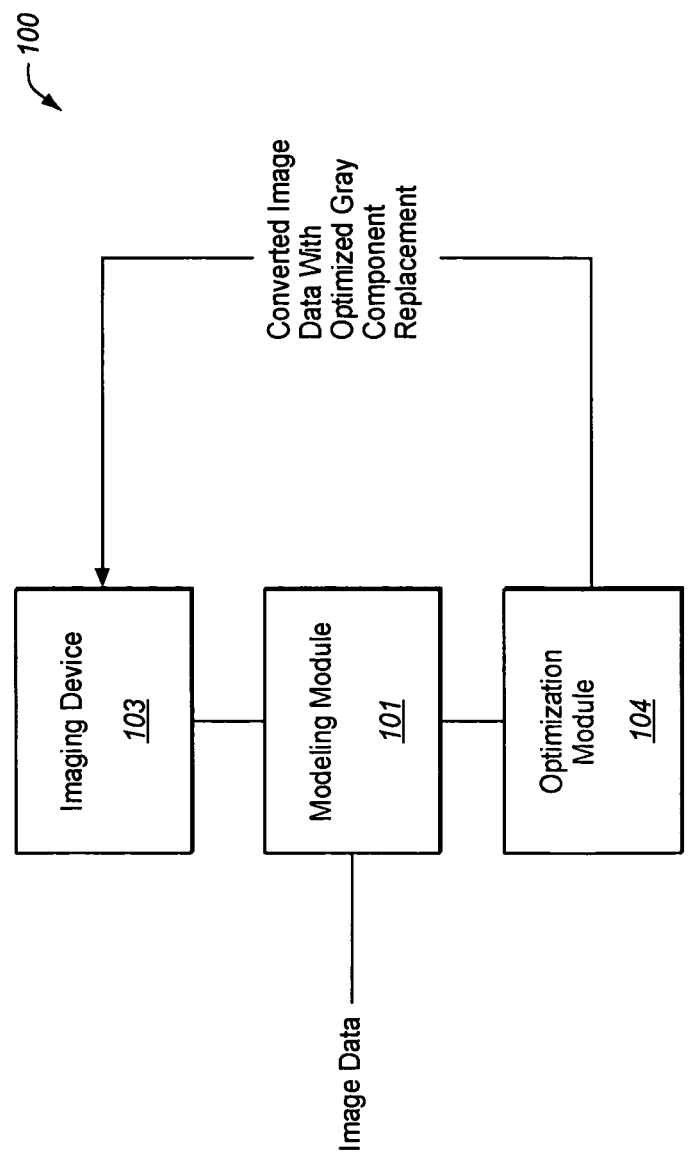
FIG. 1 is a block diagram of a gray component replacement system in one exemplary embodiment of the invention.

FIG. 1 is a block diagram of a system 100 for replacing gray components in a color image in one exemplary embodiment of the invention. The GCR optimization system 100 includes a modeling module 101 that determines a color gamut of an imaging device and generates a numerical model that is used to convert color values of received image data from an input imaging device (e.g., a digital camera, scanner, or the like) to a color space within the color gamut of the output imaging device 103. For example, the modeling module 101 may receive information pertaining to the color capabilities of a printer (e.g., the imaging device 103) and, from there, may determine the printer's color gamut. The modeling module 101 may then compute a CIELab to CMY numerical model (a reverse model) to convert the color image to a color space within the color gamut of the printer. The CIELab to CMY numerical model that is generated by the modeling module 101 may be computed using a Radial Basis Function (RBF), the details of which are further described below. The modeling module 101 may also generate an RBF based numerical model for converting color values from an in-gamut CMYK color space to a CIELab color space (a forward model).

Once the numerical models are computed, the optimization module 104 may remove a portion of CMY color values from the CMY values that are generated by the CIELab to CMY reverse numerical model. For example, the optimization module 104 may identify certain color values within the CIELab to CMY numerical model that are subject to replacement by black color values within the color gamut of the imaging device 103 to optimize the CMYK color values using a multidimensional optimization method. In this regard, the optimization module 104 may remove a portion of CMY color values generated from the CIELab to CMY reverse model and replace those color values with black color values. The optimization module 104 may then apply an optimization algorithm, such as Newton's method, using the CMYK to CIELab to optimize the CMYK values in the CIELab to CMY conversion until the image meets some requisite level of clarity. Such an optimization is described in greater detail below.

The optimization algorithm reduces the errors in a CMY to CMYK conversion, potentially to zero errors. From a printing perspective, the optimization algorithm also generally reduces the amount of toner required. While it is important to reduce the costs associated with toner/ink, it is also important that the presentation on the printable medium be aesthetically pleasing. The modeling module 101 and the optimization module 104, in using the RBFs, provide a system for reducing the amount of toner used in printing while providing aesthetically pleasing images by reducing the number of color conversion errors performed in gray component replacement.

The GCR optimization system 100 may be implemented in a variety of ways. For example, the GCR optimization system 100 may be implemented as software instructions that are operable within a variety of devices, such as the printer controller of a large-scale printing system. Alternatively, the GCR optimization system 100 may be implemented as software instructions that direct any general-purpose processor to convert color values in image data to virtually any color space. Thus, the GCR optimization system 100 is merely intended to illustrate the general implementation of GCR optimization described herein.

Figure 2:
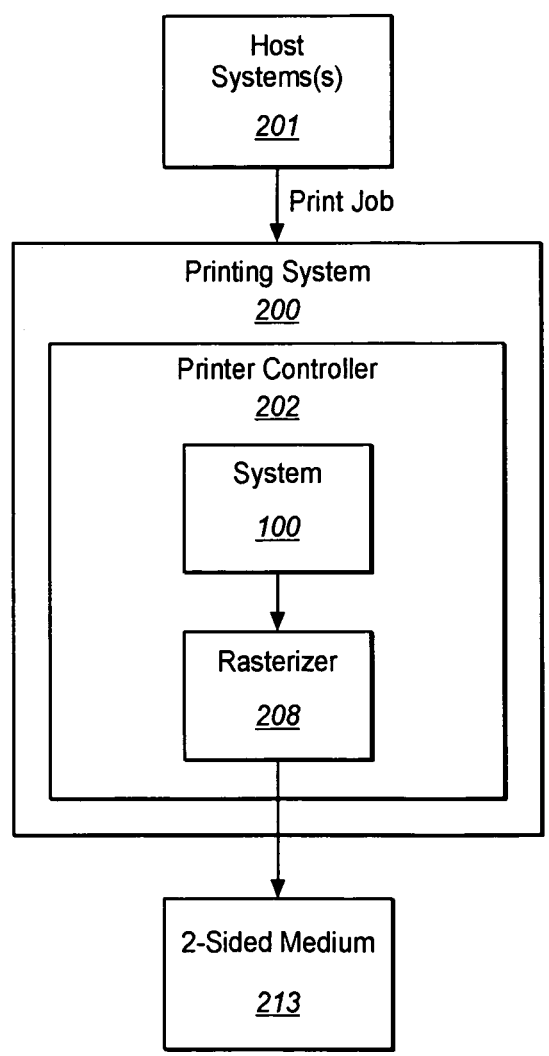
FIG. 2 illustrates a printing system employing the gray component replacement system in one exemplary embodiment of the invention.

FIG. 2 illustrates a printing system 200 employing the GCR optimization system 100 of FIG. 1 in one exemplary embodiment of the invention. The printing system 200 receives print jobs from one or more host systems 201 that are communicatively coupled to the printing system 200. Thus, when a host system user wishes to print on the two-sided medium 213, the host system user may generate a print job that directs the rasterizer 208 to do so. The printing system 200 includes a printer controller 202 that receives the print job and rasterizes the print job via the rasterizer 208. Rasterization generally regards the conversion of an image described in a vector graphics format into a raster image of pixels such as a bitmap for output to a video display or printer. Examples of a two-sided medium 213 include paper, transparent film, and any other type of material capable of being imprinted.

Prior to rasterization, the system 100 receives the image data of the print job and converts the color values therein for printing on the two-sided medium 213 while reducing toner and the costs associated therewith. In doing so, the GCR optimization system 100 determines a color gamut of the printer and generates a CIELab to CMY numerical model to convert the color image to a color space within the color gamut of the output imaging device. The GCR optimization system 100 also generates a CMYK to CIELab numerical conversion model. The system 100 removes a portion of CMY color values from the CMY values that are generated from the CIELab to CMY numerical conversion model and replaces those values with black color values. The GCR optimization system 100 then optimizes CMYK color values via a multidimensional optimization using the CMYK to CIELab numerical model prior to printing via the printer. Once the image meets a requisite level of quality, the GCR optimization system 100 prepares the image data for printing via the printer.

Those skilled in the art should readily recognize that the printer controller 201 may be implemented in software, hardware, firmware, or a combination thereof to perform the various functions associated with the printer controller 202 including the novel aspects of gray component replacement optimization as described herein. However, the invention is not intended to be limited to merely gray component replacement optimization with a printing system. Rather, the GCR optimization system 100 may be used to optimize gray component replacement of image data prior to the presentation of the image data with virtually any output device (e.g., a printer, a computer monitor, etc.).

Before discussing the numerical models for CIELab to CMYK and CMYK to CIELab color conversions in detail, a discussion of color spaces is now presented to guide the reader through an understanding of color conversions. Perceptual color spaces, such as CIEXYZ and CIELab, are visualized as three dimensional color spaces, where every color that humans can see is uniquely located. The location of any color in the space is determined by its color coordinates. In the CIEXYZ color space, the components are X, Y, and Z, where Y is luminance, X and Z do not correlate to color appearances. In the CIELab color space: the components are L*, a*, and b*, where L* is lightness of the color (e.g., L*=0 yields black and L*=100 indicates white), a* is the value between red and green (e.g., negative values indicate green and positive values indicate red), and b* is the value between yellow and blue (e.g., negative values indicate blue and positive values indicate yellow). The CIELab color space can also be described using cylindrical coordinates in the L*C*h color space where C*ab is the chroma coordinate, and h is the hue coordinate. Below are the mathematical expressions to convert a and b* into C*ab and h:

$$C^*_{ab} = \sqrt{a^{*2} + b^{*2}} \qquad (Eq.\ 1)$$

-continued $$h = \tan\left(\frac{b^*}{a^*}\right) \quad \text{(Eq. 2)}$$

The relationship between CIEXYZ and CIELab may be described using the following equations:

$$L^* = 116 f\left(\frac{Y}{Y_n}\right) - 16, \quad \text{(Eq. 3)}$$

$$a^* = 500\left(f\left(\frac{X}{X_n}\right) - f\left(\frac{Y}{Y_n}\right)\right), \quad \text{(Eq. 4)}$$

$$b^* = 200\left(f\left(\frac{Y}{Y_n}\right) - f\left(\frac{Z}{Z_n}\right)\right), \quad \text{(Eq. 5)}$$

where $X_n$, $Y_n$, $Z_n$ are the tristimulus values of a reference white and generally referred to as the white point, described as $$f(x) = \begin{cases} x^{\frac{1}{3}} & x > 0.008856 \\ 7.787x + \frac{16}{116}, & x \leq 0.008856. \end{cases} \quad \text{(Eq. 6)}$$

The color difference in either CIEXYZ or CIELab is generally calculated using the Euclidean distance. Though the CIEXYZ and CIELab color spaces are perceptual color spaces, they are not perceptually uniform color spaces as the Euclidean distance in the space does not correspond to perceptual distance. For example, the colors that have the same Euclidean distance with respect to an anchor color are on a circle. However, these circles are transformed to ellipsoids when the human perceptual distances are measured. The major axis of the ellipsoid represents the higher tolerance of the color difference and the minor axis of the ellipsoid represents the lower tolerance for the color difference. The CIELab color space is a perceptually more uniform color space than the CIEXYZ color space. Thus, the CIELab color space is the color space used most often for color-difference evaluations.

Figure 3:
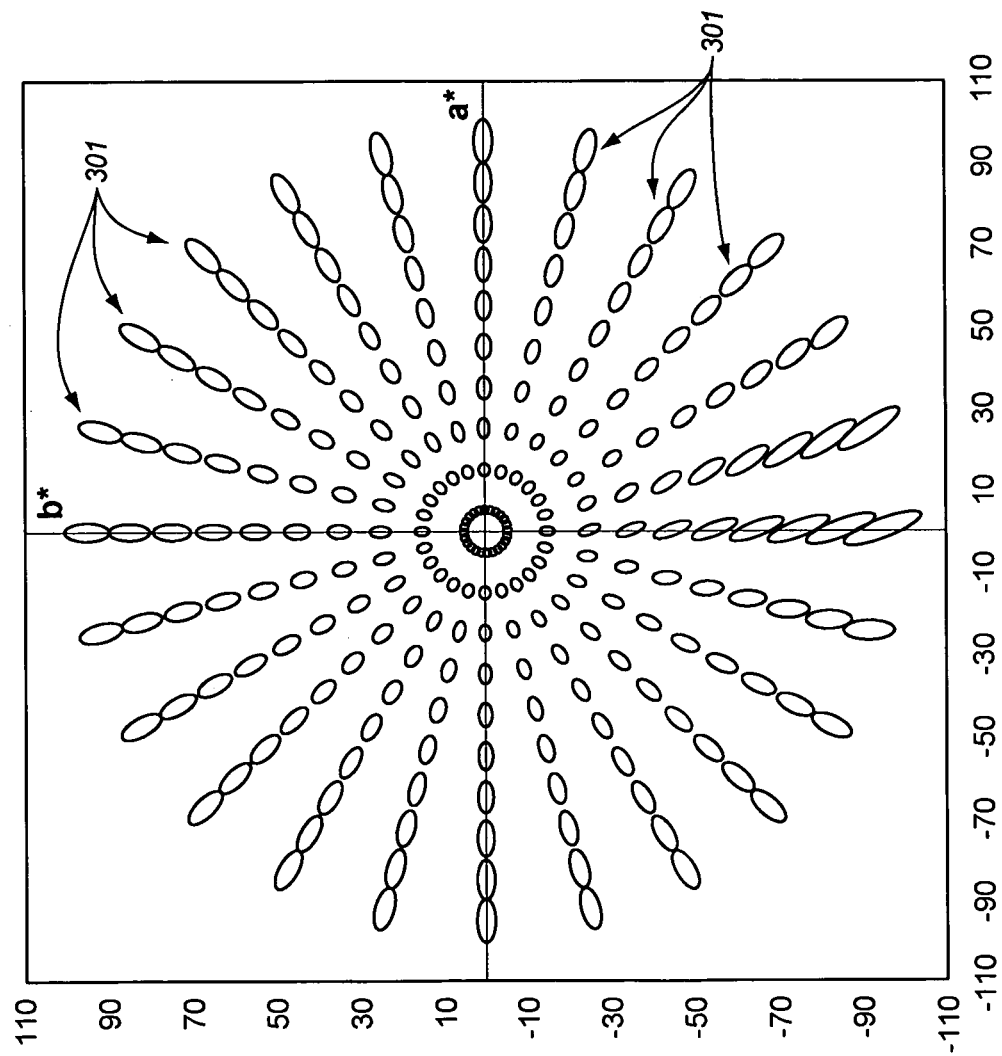
FIG. 3 illustrates the non uniformity of CIELab chroma.

In the CIELab color space, the magnitude of the perceptual color difference generally depends upon the color location and the changing direction in chroma and hue. CIELab increasingly overstates the magnitudes of perceived chroma differences. For example, the human visual system (HVS) is sensitive to the change of chroma in the neutral color area. The HVS is insensitive to the change of the chroma in a highly saturated color area. FIG. 3 illustrates such change with the ellipsoid size increases 301.

The CIELab color space is also non-uniform regarding hue angle in that the thresholds of visual tolerances are a function of hue angle. If the non-uniformity of the CIELab color space in chroma and hue is examined from another perspective, CIELab colors have different characteristics at different locations. The change of these characteristics is generally continuous. Color difference models correlate the perceptual distance with the Euclidean distance in the CILElab color space based on vast amounts of color difference experimental data.

There are several CIE perceptual-based color difference models. For example, CIEDE2000 calculates the perceptual difference by weighted lightness difference, chroma difference, hue difference, and the interaction between the chroma and the hue difference. However, the CIEDE2000 was developed for small color differences and does not perform well for large color differences. The empirical weighted color differences of lightness, chroma, and hue are often used for CIEDE2000, with higher weighting factors for hue and lightness differences and lower weighting factor for chroma differences. The color difference calculated using the Euclidean distance in CIELab is called deltae, (also referred as $\Delta E$, or $dE_{ab}$.) $dE_{00}$ represents the color difference calculated using CIEDE2000.

The color management described herein provides for more consistent and predictable colors throughout all parts of the color reproduction chain.

In general, there are two types of color management systems among color devices: additive systems such as a computer monitor and subtractive systems such as a printer. In additive systems, colors are transmitted lights. Red, green and blue lights are referred as the additive primary colors. When used in various degrees of intensity and variation, they create all other colors of light. When superimposed equally, they create gray. Primary colors of subtractive systems like printers may be cyan, magenta, yellow, and black that are used together to effectively create a multitude of other colors based on the subtractive color theory.

The color conversions for an additive system are normally between the RGB color space and CIEXYZ color space. These conversions are relatively straightforward since the gamma corrected RGB primaries are linearly related to XYZ values in the CIEXYZ space for most devices. An example of such conversion is the conversion for the RGB colors described as follows:

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} g(R_{srgb}) \\ g(G_{srgb}) \\ g(B_{srgb}) \end{pmatrix}, \quad \text{(Eq. 7)}$$

where $$g(k) = \begin{cases} \left(\frac{K+\alpha}{1+\alpha}\right)^\gamma, & K > 0.4045 \\ \frac{K}{12.92}, & \text{otherwise,} \end{cases} \quad \text{(Eq. 8)}$$

$\gamma = 2.2$, and $\alpha = 0.055$.

As is known, color printers may be toner-based or ink-based. Most of the printers are only able to produce a limited numbers of gray levels (e.g., a binary printer produces two levels (i.e., 0 and 1) 2-bit printers produce levels of 0 1, 2, and 3). In order to produce continuous tone imagery that contains an infinite range of colors or grays, a reprographic technique called halftoning is applied to create the illusion of continuous tone images through the use of dot arrangements and dots of varying size. The combination of the printer halftone design and the specific toner/ink selection determine the number of colors that a printer is physically able to produce which is called its gamut. The gamut is measured in the CIELab color space.

Printer color conversions depend the toner/ink selections and the halftone design. The conversions are generally performed between a device-dependent color space (CMYK) and a device-independent color space (CIELab). Often the format of the color conversion is an equally spaced lookup table, the values of which are either 1-byte or 2-byte integers.

In generating a printer color conversion, CMYK color patches whose values span the CMYK color spaces are printed. Each component value of CMYK is normally a 1-byte integer. The printed patches are measured using a spectral photometer which measures the spectral reflectance of each patch under a standard illuminant. The software in the spectral photometer calculates the tristimulus values and converts these values to CIELab values. The CIELab values are floating point numbers. Followed by the implementation of a data modeling algorithm and a gamut mapping algorithm, the color conversions LUTs are generated using this set of data. The CMYK and the CIELab values are normalized to the range of 0 to 1 for these calculations. Both CMYK to CIELab and CIELab to CMYK conversions may be generated for a color printer. The CMYK to CIELab color conversion is used when an image generated in this CMYK color space is to display on a monitor or to print on a different color printer. In other words, this conversion is used when the printer CMYK color space is used as a source color space. The CIELab to CMYK color conversion is used when the CIELab color space is the source color space.

For many color printers, the relationship between CMYK color space and the CIELab color space is highly nonlinear due to the interactions of cyan, magenta, yellow, and black planes in the printer subtractive system, thereby requiring complex functions. Another complication to the printer color conversion is due to the halftone design. Most halftone techniques are capable of creating color gray levels continuously. However, an abrupt change of two adjacent levels is a weakness in many halftone designs. Thus, the color conversion between CMYK and CIELab may be continuous but not differentiable.

The CMYK to CIELab color conversion is neither injective nor subjective. For example, every color in the CMYK color space may be mapped to a color in the CIELab color space. However, different CMYK values may also be mapped to the same CIELab value. So the CMYK to CIELab color conversion is not injective. The range of CIELab color space is much larger than the range of CMYK color space. That is, for many CIELab values, there are no CMYK values such that f(C, M, Y, K)→(L, a, b). Thus the CMYK to CIELab color conversion is not subjective.

Additionally, the CIELab to CMYK conversion is from R3 to R4. Thus, only one degree of freedom in this conversion exists and one CIELab value may be mapped to several CMYK values. On the other hand, because of the smaller gamut of the color printer, not every CIELab value can be mapped to a CMYK value. Since no function exists for the CIELab to CMYK color conversion, the conversion is achieved by converting the CIELab values to CMY values first and a special rule is created for adding the black toner to each CMY value.

The CIELab to CMY color conversion within a printer gamut is both injective and subjective. That is, virtually every CIELab value inside the printer color gamut can be mapped to a unique color in the CMY color space. So the CIELab to CMY color conversion is injective within color gamut. Additionally, for CMY values, there exists a CIELab value such that g(L, a, b)→(C, M, Y) where the CIELab to CMY color conversion is subjective. Out-of gamut CIELab values generally cannot be mapped to a CMY value. Therefore, no functions exist for the CIELab to CMY conversion outside the printer gamut and color conversion between the CMYK and CIELab color spaces is achieved by approximation.

Understanding the sources of error is important for the design of an approximation model. In addition, it is important to understand how these errors interfere with human perceptions for the design of the printer color conversion model. There are four significant sources of error in the color conversion process. These errors are normally measured with the Euclidean distance in the CIELab color space, $\Delta E$, and include:

1. measurement errors from the instrument, which are normally smaller than 1 $\Delta E$;
2. errors due to the machine reliability and repeatability, which for a well-calibrated printer are generally smaller than 2 units of $\Delta E$;
3. errors due to paper roughness and non-uniform paper fibers and fillers, which are typically smaller than 1 unit of $\Delta E$; and
4. errors from the model of the color conversion, which average around 3-4 units of $\Delta E$ with a maximum error between about 10 to 20 units of $\Delta E$.

Because human perceptual tolerance varies from location to location in the CIELab color space, care is taken in the approximation algorithms in different color areas. For colors in neutral areas, the visual color difference tolerance is low (around 1 $\Delta E$). The interpolation errors in these regions are generally small. If the accumulated errors from the first three categories are added to the modeling data, the effect of the outliers in the modeling set should be minimized. For the medium colors, with the increase of the chroma values in these areas, the perceptual tolerance increases. Though the outliers still exist, they play a much less important role in the color conversion. It is appropriate to design an approximation model to minimize the least squares error. For colors in the highly saturated color regions, interpolation errors are relatively high. The approximation algorithm is used to minimize the maximum error in the interpolation.

In general, color conversion approximation algorithms aim at minimizing least square errors. Due to the sources of error described above, emphasis is placed on the $L_p$ error criteria, in particular the $L_1$ and $L_\infty$ error for a robust neutral area color conversion and the reduction of maximum error in the saturated color regions. One approximation model includes the natural neighbor interpolation method, which is based on the Voronoi region. A Voronoi region $V_i$ is a set of points for which a center $c_i$ is the nearest center vector, as follows:

$$V_i = \{x \epsilon R^n i = \arg\min_{j \epsilon I} \|x - c_j\|\}, \quad \text{(Eq. 9)}$$

where I is the set of center indices. This interpolation method is a local region-based weighting method generally provides better underlying printer characteristics.

Global interpolation methods may also include the inverse distance weighting method and the RBF method. For the inverse distance weighting method, data points are used to interpolate a value by assuming that interpolated values are affected more by nearby points and less by more distant points. The assumption is not accurate for colors in many regions. Thus, this method has yielded relatively poor color conversion results. RBF data fitting equipped with an $L_p$ error-criterion, on the other hand, improves color conversion. The embodiments described herein also take into account perceptual color difference tolerance. As mentioned, perceptual color difference tolerances generally vary over different CIELab color regions. Taking this into account, the RBF data fitting technique has the advantage of minimizing color differences in different areas with respect to human perceptions or yield results.

Although black toner/ink is one of the primaries in a color printer, the black toner/ink actually serves as a "secondary" toner in color printing. Because the mix of cyan, magenta, and yellow toner/ink produces a "muddy brown" instead of black, black toner/ink is added in to make a more rich black and thereby make other colors richer and darker. Black toner/ink also typically costs less than cyan, magenta, and yellow toner/ink making the embodiments herein more advantageous from a cost perspective.

Printer CIELab to CMYK color conversion maps from R3 to R4. Additionally, CIELab is mapped to the CMY color space using an interpolation technique, then black toner/ink denoted by K, is added. The amount of cyan, magenta, yellow toner/ink may be adjusted by applying the under color removal (UCR) and the under color addition (UCA) corrections. The typical way of applying UCR is to remove equal amounts of yellow, magenta, and cyan and replace them with the same amount of black. Gray component replacement (GCR) is the result of UCR followed by UCA. However, colors resulting from UCR are generally dark, less saturated, and hue shifted. UCA may be applied to improve the weakness of UCR. Small portions of the three colors of cyan, magenta, and yellow may be added back to these areas. The UCA process is empirical and relatively processor intensive due to the mapping from a lower dimensional space to a higher dimensional space (e.g., R3 to R4) and the lack of a high fidelity model describing the nonlinear behavior of each toner. UCA is normally achieved by printing many patches and choosing the best results. In practice, the UCR and UCA correction schemes introduce errors in the color conversion process.

Because the CIELab to CMYK conversion is a map from R3 to R4, a set of CMYK values corresponding to the same CIELab value may be established. In this regard, g denotes a mapping from the CIELab values to the CMYK values such that $$\exists \{(C,M,Y,K)^{(i)}, i=1,2,\ldots k\}, s.t., g^{-1}(C,M,Y,K)^{(i)}=(L,a,b),$$ (Eq. 10)

where, i=1; 2; . . . ; k. These level sets of CMYK values may be found through an optimization process if approximation models are developed for the CMYK to CIELab conversion and the CIELab to CMY conversion.

As mentioned, gamut mismatch is problematic in color reproduction systems since each device has a different gamut. In general input devices such as digital cameras, scanners, etc., generate more colors than the output devices such as color printers. When the input color space is larger than the gamut of the output color device, gamut mapping algorithms are applied. The gamut mapping process transforms a point in the source gamut to a realizable color inside the gamut of the output device (e.g., a destination gamut). The form of this transformation can impact the quality of the reproduced images, especially print images. For high-end digital printers, the gamut is relatively small. The maximum error of color conversions normally derives from mapping an outside-gamut color to an inside-gamut color mapping.

In the gamut mapping process, a device color gamut boundary may be initially identified. The calculated boundaries are normally connected lines. Previous gamut mapping algorithms mapped out-of-gamut points directly to the destination gamut. The most typical gamut mappings include clipping and scaling algorithms. Clipping algorithms clip out-of-gamut points to the destination gamut boundary. Scaling algorithms, on the other hand, scale the input color gamut to output color gamut such that some out-of-gamut points are mapped inside the destination gamut while others are mapped to the boundary of the destination gamut. The mapping directions may include a choice of lines along which the mapping is applied (e.g., a line changing in chroma at constant lightness and hue) that are often decided based on visual experiments. The mapping directions may also be along the lines of constant perceptual attribute predictors (e.g., constant lightness and hue, constant saturation and hue), along the lines towards a single center-of-gravity (e.g., the center is the compression towards L*=50 on lightness axis), along the lines towards variable center-of-gravity (e.g., the cusp is the compression towards lightness of cusp on lightness axis), or along the lines towards the nearest color in the reproduction gamut (e.g. as is the case with minimum $\Delta E$ clipping).

The large variability in past color gamut mapping suggests that no universal gamut mapping algorithm works for every device and image. Ideal gamut mapping generally depends on image content, preservation of perceived hue throughout color space, and the extent of the gamut mismatch in various regions of color space. Relationships among color data developed by a numerical model have not previously been considered in the gamut mapping process. The underlying relationship among color data may more accurately retain or rationally transform after gamut mapping. Such is achieved herein using a numerical model with guidance from the perceptual model.

The numerical model quantitatively compares the color difference between the original color and the printed color. The original colors are the CIELab colors. These colors are converted with the printer color conversion to the CMYK colors. The CMYK colors are sent to the printer to print and then measured by spectral photometers. The numerical method tests the approximation errors inside color gamut and gamut mapping results out-side the color gamut. The mean error and the maximum error may be calculated using either $dE_{ab}$ or $dE_{00}$ for the color conversion inside the printer gamut. The maximum conversion error is often weighted more than the mean error in the evaluation because the color difference is more objectionable than the average color difference.

The perceptual model, on the other hand, correlates human perceptions with physical stimuli. A set of test images including pictorial images, vector graphics, and text samples are printed from the printer. The colors in the images include highlight colors, low-light colors, saturated colors, and out-of-gamut colors. Observers look at these images and make perceptual judgments based on the selected psychophysics method, such as the paired comparison method. On such experiments, observers are asked to compare an image pair converted by different color conversion methods. The original photos are normally presented as the reference. Typical questions are "Which one do you like better?", "Which one is more similar to the original image?", etc. The data is analyzed and converted to perceptual values using Thurstone's law of comparative judgment.

To assist the reader in the development of the numerical model, this disclosure broken into certain sections. Specifically, the sections are entitled "FITTING NON-LINEAR SCATTERED DATA", "OVERDETERMINED LINEAR SYSTEMS IN THE $L_\infty$ SENSE", "COLOR CONVERSION USING THE $L_1$ NORM APPROXIMATION", "ONE DIMENSIONAL COLOR MANIFOLDS IN THE CMYK COLOR SPACE", "COLOR CONVERSION WITH INK LIMITATIONS", and "GAMUT MAPPING". The section entitled "FITTING NON-LINEAR SCATTERED DATA" provides the reader with a detailed description of solving printer color conversion problems using RBFs and data fitting techniques adapted to the $L_\infty$ and the $L_1$ error criteria. The section entitled "OVERDETERMINED LINEAR SYSTEMS IN THE L, SENSE" presents the reader with the Barrodale and Phillips dual algorithm (the "BP" algorithm) and the Bartels, Conn, and Li primal algorithm (the "BC" algorithm) for converting relatively large sparse problems to linear programming problems. The section entitled "COLOR CONVERSION USING THE $L_1$ NORM APPROXIMA- TION" illustrates a general $L_1$ approximation for overdetermined linear systems, the BR algorithm for solving the primal problem, and the $L_1$ approximation as it is used in color conversion. The section entitled "ONE DIMENSIONAL COLOR MANIFOLDS IN THE CMYK COLOR SPACE" introduces the reader to an optimized GCR algorithm with relatively high quality toner/ink selection. The section entitled "COLOR CONVERSION WITH INK LIMITATIONS" discusses toner/ink limitations implemented as a constraint in the linear programming problem formulations. The section entitled "GAMUT MAPPING" introduces the reader to the concept of numerical gamut mapping based on the RBFs discussed above and enhanced by the perceptual gamut mapping.

Fitting Non-Linear Scattered Data

Problems with the interpolation techniques are overcome through the use of RBFs that include data fitting techniques adapted to $L_\infty$ and $L_1$ error criteria. Additionally, a perceptual color model is used to guide the implementation of the RBFs. For example, in order to solve nonlinear approximation problem using RBFs, a clustering algorithm is employed using the combination of the Linde-Buzo-Gray (LBG) algorithm and the covariance matrix-based algorithm. RBFs may then be selected and parameters thereof may be optimized. Approximation algorithms are generated for the $L_p$ norm (emphasis on the $L_\infty$, $L_2$, and $L_1$ norm) for the neutral, intermediate, and saturated color areas. A K-fold cross validation then refines the model parameters and an optimized overlapping area between two different models is determined.

Theoretically, a color printer is capable of producing at least 4 bytes of colors (1 byte each of cyan, magenta, yellow, and black). A subset of these CMYK colors and their associated CIELab values may be used to generate a color conversion model. Because of the underlying complicated characteristics of a color printer, a large CMYK data set and the associated CIELab values (often above 2000 data points) are selected to generate the color conversion model. The data selection depends in part on the halftone design which occasionally yields a nonlinear response. The data selection also depends on the perceptual color difference tolerance as the perceptual color difference tolerances vary over different CIELab color regions. Therefore, different color conversion models should be generated for different regions based on the perceptual color difference tolerance. The continuity and smoothness of these color conversion models are important to the overall quality of the color conversion. RBFs provide the flexibility of applying to both the interpolation and approximation data fitting problems. RBFs are useful to interpolate scattered data as the associated system of linear equations is invertible under relatively mild conditions on the locations of the data points.

Generally, RBFs are useful for approximating an unknown function from the data in the form $$f(x) = Ax + a_0 + \sum_{i=1}^{N} w_i \phi(\|x - c_i\|),\qquad\text{(Eq. 11)}$$

where f(x) is assumed to be continuous and differentiable over a compact domain of $x \in R^n$ and $f(x) \in R$. The term Ax represents the linear component of the mapping and the offset $a_0$ allows for the mean of the data to be non-zero. The nonlinear portion of the map is represented by the superposition of the nonlinear function $\phi$ weighted by vectors $w_i$.

The RBF has several important features. For example, the weight parameters may be determined using linear models, the RBFs may be either local or global and the locations of the basis functions may be adapted using different clustering routines. For color conversion, the Voronoi region, for example, may provide relatively good clustering because it can incorporate the color difference model to characterize each cluster with its unique characteristics. Also, RBFs generally do not require data to lie on any sort of regular grid and the function $f(x)$ is continuous and differentiable.

Traditionally, the weights $w_i$ were determined by minimizing the mean-square error. However, due to the unique error characteristics in color conversion, the algorithms for solving the RBFs' weights using $L_p$ norm emphasizes $L_\infty$ norm, $L_2$ norm, and $L_1$ norm. Accordingly, the approach describes herein includes choosing a training/testing data set for color conversion, clustering the color data, determining the centers optimizing the number of centers, and optimizing RBFs and parameter selections. Then, the $L_p$ norm selections (specifically, the $L_\infty$, $L_2$, and $L_1$ norms) may be optimized and the RBFs combined with linear programming for the $L_\infty$ norm and $L_1$ norm approximation employing the duality theorem. Thereafter, the perceptual color model may be employed to improve the qualitative result.

The color conversion model is built based on the availability of a data set of input-output pairs, such as CMYK vs. CIELab. There are many ways to select a set of training data. For example, the CMYK colors in regular grids may be selected or the CMYK colors based on the halftone curves may be selected. In any case, the CMYK data is printed on a color printer and measured in the CIELab color space. For the CMYK to CIELab conversion, these CIELab values are random within the printer gamut and can be expressed for f: $R4 \rightarrow R3$ in the following form:

$$\{x^{(i)}=(C,M,Y,K)^{(i)} \in R4, i=1,2,\ldots,m\} \qquad \text{(Eq. 12)}$$

$$\{y^{(i)}=(L,a,b)^{(i)} \in R3, i=1,2,\ldots,m\}, \qquad \text{(Eq. 13)}$$

where m is the number of color pairs in the data set. For the CIELab to CMYK conversion, g: $R4 \rightarrow R3$ $$\{x^{(i)}=(L,a,b)^{(i)} \in R3, i=1,2,\ldots,m\} \qquad \text{(Eq. 14)}$$

$$\{y^{(i)}=(C,M,Y,K)^{(i)} \in R4, i=1,2,\ldots,m\}. \qquad \text{(Eq. 15)}$$

The printer color conversions described herein include both CMYK to CIELab and the CIELab to CMYK color conversions. The CIELab to CMYK conversion is achieved by converting the CIELab values to the CMY values first and then adding black to each CMY value via the GCR process. Therefore, the CMYK set should have enough CMY and K values. Generally, the grid points of cyan, magenta, yellow, and black components are used to represent the curve change of each component created by the halftone process. This means that the grids point may not be equally spaced.

Data clustering is used to identify the locations where basis functions should be placed in the model. In general, RBF algorithms focus on placing functions such that the mean square error is minimized. Due to the uniqueness of perceptual color characteristics, the location of the basis function should be placed in the local regions which have similar properties in terms of human visual tolerances. As mentioned, the CMYK values are device-specific values and do not directly relate to human perception. In the construction of the mapping g: $R4 \rightarrow R3$ and f: $R4 \rightarrow R3$, clustering is performed on the CIELab data so the characteristics of the color data can be described by each cluster. The visual tolerances of color data may be determined using a color difference model. The most recent color difference model CIEDE2000 is used as the distance metric for each color relative to the center color because the distances are designed to be small.

The clustering algorithm also combines the Voronoi-based clustering algorithm with a subset selection algorithm. Because the CIELab data are random, a random center selection algorithm may be used as the first step for clustering/center selections. The clustering algorithms are then used to identify the clusters and to refine the center of each cluster. There are several efficient clustering algorithms available that may be used including "k-means," LBG, and topology-preserving mappings. The algorithm generally proceeds by selecting an initial number $N_c$ of centers randomly from the m data points in the training set and, for each center, computing the Voronoi set (i.e., all points in the data closest in the perceptual color space to this center relative to other centers). Then, the centers as the mean of the points in the Voronoi set are updated. This is repeated until the CIELab values of these centers no longer change. The clustering algorithm described above can be effectively combined with a subset selection algorithm, such as the orthogonal least squares (OCS) algorithm or the covariance matrix algorithm of commonly owned and co pending U.S. Patent Application Publication No. 2007/009796, the entire contents of which are incorporated by reference, to eliminate unnecessary clusters.

The OLS algorithm identifies which of the N centers are most useful in the RBF model and indicates which centers may be deleted from the model and at what expense to accuracy expressed in color difference. The computation of the weight parameters in Eq. 11 is an over-determined least squares problem. Thus, a solution is sought to the set of inconsistent equations, $$y = \Phi w, \quad (Eq\ 16)$$

where each column of the matrix (is associated with a single center and f does not actually reside in the column space of $\Phi$. In general, a quality function is associated with a center. In this case, the value of a column $\phi_i$ of $\Phi$ is measured to solve the least squares. One measure is the cosine of the angle between f and each column of $\Phi$, such as $$v_i = \left( \frac{f^T \phi^{(i)}}{\|f\| \|\phi^{(i)}\|} \right)^2. \quad (Eq.\ 17)$$

In other words, the center is the one for which $v_i$ is largest (i.e., where the angle is smallest). This solution is indexed by i* meaning $\phi_i^*$ is the solution to optimization. Once the column and hence the RBF center of $\Phi$ has been determined, the next best center can be computed by projecting the remaining columns along $\phi_i^*$. This approach may be iterated to obtain a reduced subset of centers that has acceptable modeling accuracy. This algorithm may therefore proceeds as follows:

Let k=1, 2, . . . , $N_c$
Step 1: k=1

$$i_1 = \arg\max \left( \frac{f^T \phi^{(i)}}{\|f\| \|\phi^{(i)}\|} \right)^2 \quad (Eq.\ 18)$$

$$q^{(1)} = \phi^{(i_1)} \quad (Eq.\ 19)$$

Step k=1

$$\alpha_{jk}^{(i)} = \frac{q_j^T \phi_i}{q_j^T q_j}, \quad 1 \le j < k \quad (Eq.\ 20)$$

$$q_k^{(i)} = \phi_i - \sum_{j=i}^{k-1} \alpha_{jk}^{(i)} q_j \quad (Eq.\ 21)$$

$$i_k = \arg\max \left( \frac{f^T q_k^{(i)}}{\|f\| \|q^{(i)}\|} \right)^2 \quad (Eq.\ 22)$$

where $i_k \le i \le N_c$, $i \ne i_1$, . . . $i \ne i_{k-1}$, and $$q_k = q_k^{i_k} = \phi_{i_k} - \sum_{j=1}^{k-1} \alpha_{jk} q_k. \quad (Eq.\ 23)$$

The algorithm ends at the Mth step when $$1 - \sum_{j=1}^{M} \left( \left( \frac{f^T q_j}{\|f\| \|q_j\|} \right)^2 \right) < \rho, \text{ where } 0 < \rho < 1 \quad (Eq.\ 24)$$

A cluster can also be described by its mean vector and variance-covariance matrix. The mean vector is the center of the cluster and the variance-covariance matrix consists of the variances of the color data points along the main diagonal and the covariance between each pair of color components in the other matrix positions. For example, if a cluster is in the CMYK color space, the covariance of this cluster provides a measure of the strength of the correlation between any two color components. Let the center CMYK value of a cluster be $\bar{x}=(\bar{C},\bar{M},\bar{Y},\bar{K})$ (i.e., $\bar{x}_1=\bar{C}$, $\bar{x}_2=\bar{M}$, $\bar{x}_3=\bar{Y}$, $\bar{x}_4=\bar{K}$) and let $m_c$ denote the number of data points in a cluster. The formula for computing each element $COV_{jj'}$ in a 4×4 CMYK covariance matrix for a cluster is:

$$COV_{jj'} = \sum_{i=j}^{mc} [(x_j^i - \bar{x}_j)(x_{j'}^i - \bar{x}_{j'})]/(m_c - 1), \quad (Eq.\ 25)$$

where j; j'=1, . . . , 4. When the rank of the covariance matrix is less than the number of the input color components, the correlations are not all independent of each other. Also, the number of the data points in the cluster is less than the number of color components.

A Gaussian function which can be expressed as the function of the covariance matrix is not selected if a non-full rank cluster exists. Thus, the clustering algorithm proceeds by calculating the covariance matrix of each cluster and, if the rank of the covariance matrix of a cluster is less than the number of input color components, the center of this cluster is deleted and the data points in the cluster are moved to nearby clusters. Thereafter, the center of each cluster is updated and the LBG algorithm is updated to refine each cluster. This is repeated until every cluster has a full rank covariance matrix.

The radial basis functions themselves are generally selected so that they satisfy an invertibility condition on the square interpolation problem for the weights. These functions have expansions, such as those given by Eq. 11, that represent continuous functions over compact domains. The location of these functions is stipulated by the vector centers {ck} generally scattered over the domain in a manner that reflects the distribution of the data. Both theoretical investigation and practical results suggest that the choice of the nonlinearity ø(·) is not critical to the performance of the RBF. However, for the color conversions from CMYK to CIELab, and CIELab to CMYK, the multiquadric function $$\phi(x) = \sqrt{r^2 + x^2}$$ (Eq. 26)

is generally more accurate. Other functions that may be used include the Gaussian $$\phi(x) = \exp\left(\frac{-x^2}{r^2}\right)$$ (Eq. 27)

and the inverse multiquadratic function $$\phi(x) = \frac{1}{\sqrt{r^2 + x^2}}.$$ (Eq. 28)

Regardless of the function used, the radius r in Gaussian, multiquadratic, and inverse multiquadratic is optimized. Generally, the multidimensional Newton's method is an efficient optimization method for 2-norm least square settings. In this case, the objective function aims at minimizing the mean error. For example, using the color conversion from CMYK to CIELab:R4→R3, $$f_L(x_i, r_L) = A_L x_i + a_{L0} + \sum_{j=1}^{n} w_{Lj} \phi_L(\|x_i - c_j\|, r_L)$$ (Eq. 29)

$$f_a(x_i, r_a) = A_a x_i + a_{a0} + \sum_{j=1}^{n} w_{aj} \phi_a(\|x_i - c_j\|, r_a)$$ (Eq. 30)

$$f_b(x_i, r_b) = A_L x_i + a_{b0} + \sum_{j=1}^{n} w_{bj} \phi_b(\|x_i - c_j\|, r_b)$$ (Eq. 31)

The problem formulation is thus:

$$E(r_L, r_a, r_b) = \sum_{i=1}^{m} \left[ (f_L(x_i, r_L) - y_1^i)^2 + (f_a(x_i, r_a) - y_2^i)^2 + (f_b(x_i, r_b) - y_3^i)^2 \right]$$ (Eq. 32)

$$E_{min} = E(r_L, r_a, r_b)$$ (Eq. 33)

Then for each iteration, let $$g^{(k)} = \begin{pmatrix} \partial E/r_L \\ \partial E/r_a \\ \partial E/r_b \end{pmatrix}$$ (Eq. 34)

-continued $$F(k) = \begin{pmatrix} \frac{\partial^2 E}{\partial^2 r_L} & \frac{\partial^2 E}{\partial r_L \partial r_a} & \frac{\partial^2 E}{\partial r_L \partial r_b} \\ \frac{\partial^2 E}{\partial r_a \partial r_L} & \frac{\partial^2 E}{\partial^2 r_a} & \frac{\partial^2 E}{\partial r_a \partial r_b} \\ \frac{\partial^2 E}{\partial r_b \partial r_L} & \frac{\partial^2 E}{\partial r_b \partial r_a} & \frac{\partial^2 E}{\partial^2 r_b} \end{pmatrix}.$$ (Eq. 35)

Accordingly, $$r_{k+1} = r^{(k)} - F(r^{(k)})^{(-1)} g^{(k)}.$$ (Eq. 36)

For every $r^{(k+1)}$, the weighting factor $w_j$'s are updated and the new function E(r) is obtained. The iteration stops when E(r) does not improve.

The algorithms for RBF data fitting may depend on the selection of norms. For color conversions, the norm may be selected considering the visual tolerance of the colors in the CIELab color space and the source of errors in the color conversion process. For example, different norms should be selected for differential color regions, such as $L_1$ norm:

$$|x|_1 = \sum_{i=1}^{m} |x_i|$$ (Eq. 37)

$L_2$ norm:

$$|x|_2 = \sqrt{\sum_{i=1}^{m} x_i^2}$$ (Eq. 38)

$L_\infty$ norm:

$$|x|_\infty = \max_{1 \leq x \leq m} |x_i|.$$ (Eq. 39)

The relationship of errors via $L_1$ norm, $L_2$ norm, and $L_\infty$ may be stated as:
For all e in C[a; b] the inequalities, $$\|e\|_1 \leq (b-a)^{1/2} \|e\|_2 \leq (b-a) \|e\|_\infty$$ (Eq. 40)

hold.

This theorem indicates that it small errors are found via $L_\infty$ norm, then the errors via $L_1$ norm and $L_2$ norm are also small. Thus, [a, b]=[0, 1], and the CIELab color space may be heuristically chosen in three regions:
1. Neutral region: $0 \leq C_{ab}^* \leq 7$;
2. Medium color region: $7 < C_{ab}^* \leq 30$; and
3. Saturated color region: $C_{ab}^* > 30$,
where $C_{ab}^*$ is the chroma of colors in CIELab color space.

For the neutral color region, the visual color difference tolerance is relatively small. Error from the measurements and machine can affect the accuracy of color conversion. The $L_1$ norm is chosen since it is least sensitive to the outliers. For the medium color range, the color difference tolerance is larger and the errors from the measurements and machine play less of a role affecting the quality of the color conversions. However, control of the color conversion error should be less than a magnitude of 2 so the color difference is less visible. The $L_2$ norm is chosen to minimize the average error. For the saturated color regions, the errors are generally small compared to the color conversion error of gamut mapping and it is unlikely for the HVS to detect any errors with magnitude less than 2. To minimize the maximum error of the color conversion, the $L_\infty$ norm is generally chosen.

As mentioned, the continuity and smoothness are important to the quality of the color conversion. When adjacent clusters or two adjacent regions have different mapping functions, data in the adjacent clusters may be included in the current cluster. Overlapping ranges specified as $\delta$'s for each region are optimized. The $\delta$ values are the distances calculated in the CIELab color space. The data regions partitioned for the $L_1$, $L_2$, and $L_\infty$ approximation are:

1. $L_1$ approximation: $0 \leq C_{ab}^* < 7+\delta_n$. Intended range: $0 \leq C_{ab}^* \leq 7$;
2. $L_2$ approximation: $7-\delta_{ml} < C_{ab}^* < 30+\delta_{mu}$. Intended range: $7 \leq C_{ab}^* \leq 30$;
3. $L_\infty$ approximation: $C_{ab}^* > 30-\delta_s$. Intended range: $C_{ab}^* \geq 30$, where $\delta_n$ is the extended region for the $L_1$ norm, $\delta_{ml}$ and $\delta_{mu}$ are the upper and lower extended regions for the $L_2$ norm, and $\delta_s$ is the extended region for the $L_\infty$ norm. For the CMYK to CIELab conversion, the domain space is the undivided CMYK color space. For the Cielab to CMY conversion, the domain space is the CIELab color space divided into three regions based on the selected set of training data described above. Although shown and described with a particular range, the invention is not intended to be so limited. For example, the approximation may be varied as desired to change the granularity of the approximation.

Validation techniques, such as "cross validation" and "bootstraps", may be used for model accuracy estimation and model selection. Among the cross validation techniques, the "K-fold cross" validation and the "leave-one-out" cross validation may be used. Using the cross validation technique, the absolute accuracy and the bias of variances should be balanced.

In general, several thousand data points are selected for building a color conversion model. A relatively large K number may be chosen to ensure the model accuracy. Different from other cross validation applications, the evaluation of color conversion models involves both numerical analysis and psychophysics analysis. For the numerical analysis, the test data set is collected spanning the input color space. For the perceptual analysis, a number of images may be selected in a visual experiment.

$L_1$, $L_2$, and $L_\infty$ approximations may be used to select the K value to the color conversion. For the $L_2$ approximation, the mean error may be used as the measure for the model selection. And, for the $L_1$ and $L_\infty$ approximations, the $L_1$ error and maximum error may be calculated instead, respectively. In any case, the variance as a function of the K value may be obtained to decide the K value. The cross validation technique is described using CMYK to CIELab conversion as an example. First, the modeling set is divided into K-fold partition data sets. For each of K experiments, K−1 folds are used for training with the remaining one for testing. Then, K-fold cross validation is applied to determine the best K value and model. The mean error decreases with the increase of the K value for K<10 and it stays roughly at the same level for K>15. On the other hand, the variance of the mean error stays relatively flat for K<15 and increases with the increase of the K value. Although the maximum error decreases and the mean error stays relatively flat for K>15, the K value for the least squares approximation for the color conversion is generally 15 due to the increase of the variance.

The CMYK to CIELab conversion may be performed using the RBF data fitting algorithm in the $L_2$ norm. In this regard, data may be clustered using the combination of the LBG algorithm and the covariance matrix algorithm. Generally, there are two optimization stages. Initially, a relatively good starting function and radius for the R4→R3 optimization is sought. Then, models of R4→R for the CMYK to L*, a*, b* conversions are sought.

In the next modeling stage, $f_L$, $f_a$, and $f_b$ are set to multiquadratic with initial $r_L$, $r_a$, and $r_b$. The multidimensional Newton's method is then applied to optimize these parameters. For the CIELab to CMY conversion, both data range ($\delta_{ml}$ and $\delta_{mu}$) for the least squares approximation and the color conversion model are optimized by letting $\delta_{ml} 0$, $\delta_{mu} = 0$, and k=0, such that $s_k = \{(L,a,b)_{jk} | 7 \leq C_{abjk}^* \leq 30\}$, and initiating the clustering algorithm to find the clusters. Then, R3→R is optimized for the CIELab to C, M, and Y conversions, respectively. The multidimensional Newton's method of R3→R3 is performed for the CIELab to CMY conversion and the mean error and maximum error are recorded.

Afterwards, let $\delta_{ml}=2.5$, $\delta_{mu}=2.5$, and k=0, such that $s_k=\{(L,a,b)_{jk}|7-2.5k \leq C_{abjk}^* \leq 30+2.5k, k=1, 2, \ldots,\}$ repeat the optimization process stopping when all data points are included in $s_k$. The least square errors are obtained by calculating the differences between the original values and the estimated values. The optimized models indicate the Gaussian function for the cyan component, the inverse multiquadratic for the magenta component, and the multiquadratic function for the yellow component, thereby providing inside gamut color conversions from CIELab to CMY, $g_0$, and CMY to CIELab, $f_0$.

Overdetermined Linear Systems in the $L_\infty$ Sense

In saturated color areas, the perceptual color difference tolerance is generally higher than the magnitude of machine and instrument errors. Data outliers do not play a significant role in the color conversion. The maximum error is weighted in the color conversion quality assessments. Thus, it is desirable to reduce the maximum approximation error by solving the problem via the $L_\infty$ approximation, also referred as the Chebyshev norm. From norm inequalities if $L_\infty$ norm is controlled, then the $L_1$ and $L_2$ error is generally small.

Many algorithms have been developed for this type of application function approximation using the $L_\infty$ norm that are locally equivalent to the exchange algorithm. However, there is limited research on scattered data fitting techniques using the $L_\infty$ norm especially for the large sparse problems. Large sparse problems are often converted to linear programming problems using the linearized sub-problem as the basis. Among these algorithms, the Barrodale and Phillips dual algorithm (the "BP" algorithm) and the Bartels, Conn, and Li primal algorithm (the "BC" algorithm) are suitable algorithms for solving overdetermined linear systems Rn→R in the Chebyshev norm.

The BP and BC algorithms may be suitable in view of the similarity of the formulations with the RBF approach. As the BP and BC algorithms are generally used in $R^n \to R$, the extension of the BP dual algorithm may be extended to R3→R3 for color conversion from CIELab to CMY. In this regard, the Chebyshev norm may be described by letting $$Ax = b, \quad \text{(Eq. 41)}$$

where $A=[a_1, a_2, \ldots, a_n] \in Rm \times m$, $m > n \geq 2$, and $b^T = [\beta_1, \beta_2, \ldots, \beta_m] \in Rm$. Then, the vector $x \in Rn$ is determined such that $$\|Ax - b\|_\infty = \max_{1 \leq i \leq m} |a_i^T x - \beta_i| \quad \text{(Eq. 42)}$$

is minimized. L is then defined as a linear space spanned by the functions $\{\phi_i\}$ $$L = \langle \phi_1(z), \phi_2(z), \ldots, \phi_n(z) \rangle, \quad \text{(Eq. 43)}$$

where each $\phi_j$ is continuous on $[a,b]$, $j=1, \ldots, n$. A function $\phi \in L$ may then be expressed as $$\phi(z) = \sum_{j=1}^{n} \alpha_j \phi_j(z) \in L, \quad \text{(Eq. 44)}$$

where $z \in [a,b]$. The RBF is a relatively good example of such a space. Given $m > n \geq 2$, data points $\{(z_i; y_i); i=1; 2; \ldots; m\}$, $\alpha = (\alpha_1, \ldots, \alpha_n)$ is determined to minimize $$e(\alpha_1, \ldots, \alpha_n) = \left\| y_i - \sum_{j=1}^{n} \alpha_j \phi_j(z_i) \right\|_\infty \quad \text{(Eq. 45)}$$

$$= \max_{1 \leq i \leq m} \left| y_i - \sum_{j=1}^{n} \alpha_j \phi_j(z_i) \right|. \quad \text{(Eq. 46)}$$

Then, $$x = \alpha = \{a_1, \alpha_2, \ldots, \alpha_n\} \quad \text{(Eq. 47)}$$

$$A = \begin{pmatrix} \phi_1(z_1) & \phi_2(z_1) & \ldots & \phi_n(z_1) \\ \ldots & & & \\ \ldots & & & \\ \phi_1(z_m) & \phi_2(z_m) & \ldots & \phi_n(z_m) \end{pmatrix} \quad \text{(Eq. 48)}$$

and $$b = (y_1 \ y_2 \ \ldots \ y_m)^T. \quad \text{(Eq. 49)}$$

Next, the $L_\infty$ approximation may be converted to a standard form of the linear programming. First, however, the primal form of the problem is established by letting $\xi$ denote the maximum error. For example, $$\xi = \max_{1 \leq i \leq m} e_i(\alpha_1, \alpha_2, \ldots, \alpha_n), \quad \text{(Eq. 50)}$$

where e is defined in Eq. 41.

The primal problem may then be formulated by minimizing $\xi$ subject to $$= \xi + \sum_{j=1}^{n} \alpha_j \phi_j(z_i) \geq y_i \text{ and} \quad \text{(Eq. 51)}$$

$$= \xi - \sum_{j=1}^{n} \alpha_j \phi_j(z_i) \geq -y_i, \quad \text{(Eq. 52)}$$

for every i where $$\xi \geq 0 \quad \text{(Eq. 53)}$$

and $$\alpha_1, \alpha_2, \ldots, \alpha_n \text{ are unrestricted.} \quad \text{(Eq. 54)}$$

The standard form of the corresponding dual linear program may be transformed from the above primal linear program via $$\max \sum_{i=1}^{m} (\sigma_i - \tau_i) y_i \quad \text{(Eq. 55)}$$

subject to $$\sum_{i=1}^{m} (\sigma_i - \tau_i) \phi_{ji} = 0 \quad \text{(Eq. 56)}$$

$$\sum_{i=1}^{m} (\sigma_i + \tau_i) \leq 1 \quad \text{(Eq. 57)}$$

and $$\sigma_i, \tau_i \geq 0, \ i = 1, 2, \ldots m, \quad \text{(Eq. 58)}$$

where $\phi_{ji} = \phi_j(z_i)$

To understand the BP dual algorithm, an understanding of the exchange algorithm and related theorems which almost all Chebyshev approximation algorithms are based is helpful. In this regard, A may be defined as a linear subspace of C[a,b], $f \in C[a, b]$, and L is any closed subset of $[a, b]$, $p \in A$, such that $$e^*(x) = f(x) - p^*(x) \quad \text{(Eq. 59)}$$

and $$L_M = \{x \in L | e^*(x) \text{ obtains extreme values}\}. \quad \text{(Eq. 60)}$$

p* provides for a minimax solution to be approximation from A to f, if $\forall p \in A$, such that $$e^*(x)p(x) = [f(x) - p^*(x)]p(x) > 0, \forall x \in L_M \quad \text{(Eq. 61)}$$

(e.g., e*(x) and p(x) are of same signs at all extreme points).

In this regard, the "Haar" condition defines a class of functions upon which the Exchange Algorithm can be applied. For example, A may be defined as an (n+1) dimensional linear subspace of C[a, b]. A satisfies the Haar condition if $\forall p \in A$, the number of roots of the equation $$\{p(x) = 0; a \leq x \leq b\} \quad \text{(Eq. 62)}$$

is less than the dimension of A.

A derived condition states that if $\{\xi_i: i=1; 2, \ldots, k\} \subset [a, b]$, $k \leq n$ then $\exists p \in A$, such that p changes signs at $\xi_i: i=1; 2, \ldots, k$ and p has no other roots. The RBFs in the form of Eq. 11 meet the Harr condition because of the linear part in the equation. Then, let A be an (n+1)-dimensional linear subspace of C[a, b] that satisfies the Haar condition and let f be any function in C[a, b]. Then p* is the minimax approximation from A to f, if there exists (n+2) points $\{\xi_1^*; i=0; 1; \ldots; n+1\}$, such that the conditions 1. $a \leq \xi_0^* < \xi_1^* < \ldots < \xi_{n+1}^* \leq b$,
2. $|f(\xi_i^*) - p^*(\xi_i^*)| = \|f - p^*\|_\infty, i=0, 1, \ldots, n+1$ and
3. $f(\xi_{i+1}^*) - p^*(\xi_{i+1}^*) = -[f(\xi_i^*) - p^*(\xi_i^*)], i=0, \ldots, n$, alternative signs]] are obtained.

Then, let A be a finite-dimension subspace of C[a, b] that satisfies the Haar condition and let $\{x_i: i=1; 2; \ldots; m\}$ be a set of distinct points from [a, b], where m is not less than the dimension of A. For any f in C[a, b], let the one-point exchange algorithm be applied to calculate the element of A that minimizes expression $$\max_{i=1,2,\ldots m} |f(x_i) - p(x_i)|, \; p \in A \qquad \text{(Eq. 63)}$$

Then, the required approximation to f is obtained in a finite number of iterations.

Figure 4:
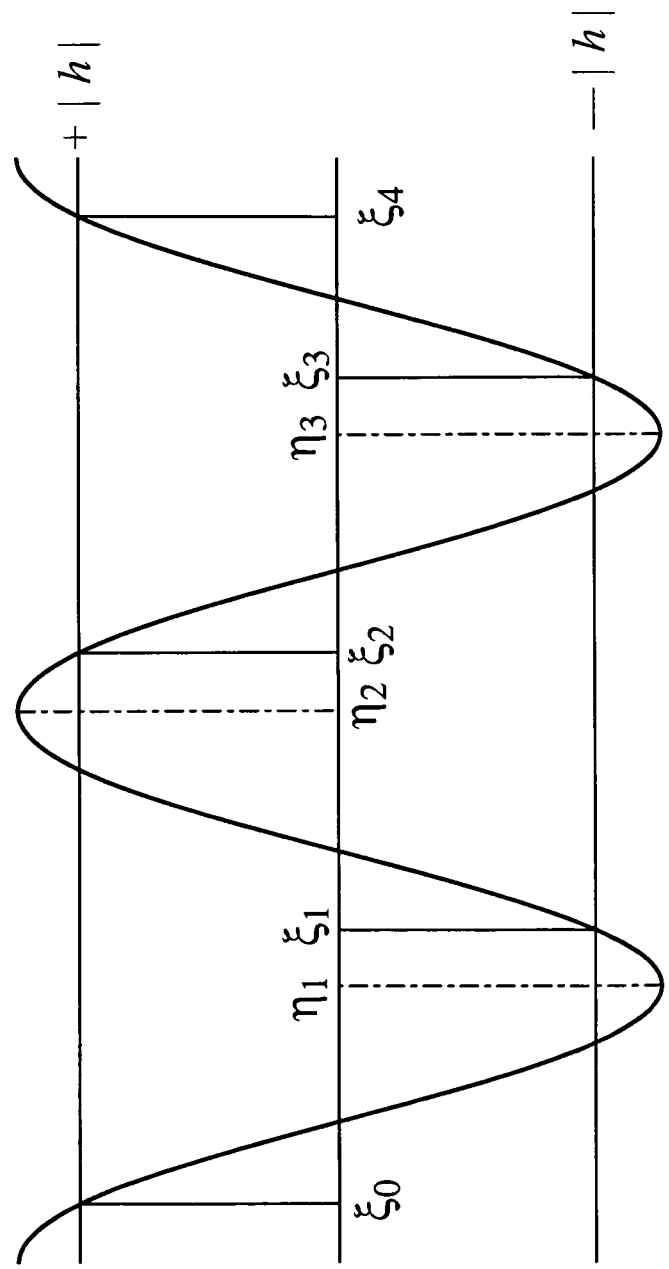
FIG. 4 is a graphical illustration of the Minimax Characterization Theorem (MCT).
Figure 5:
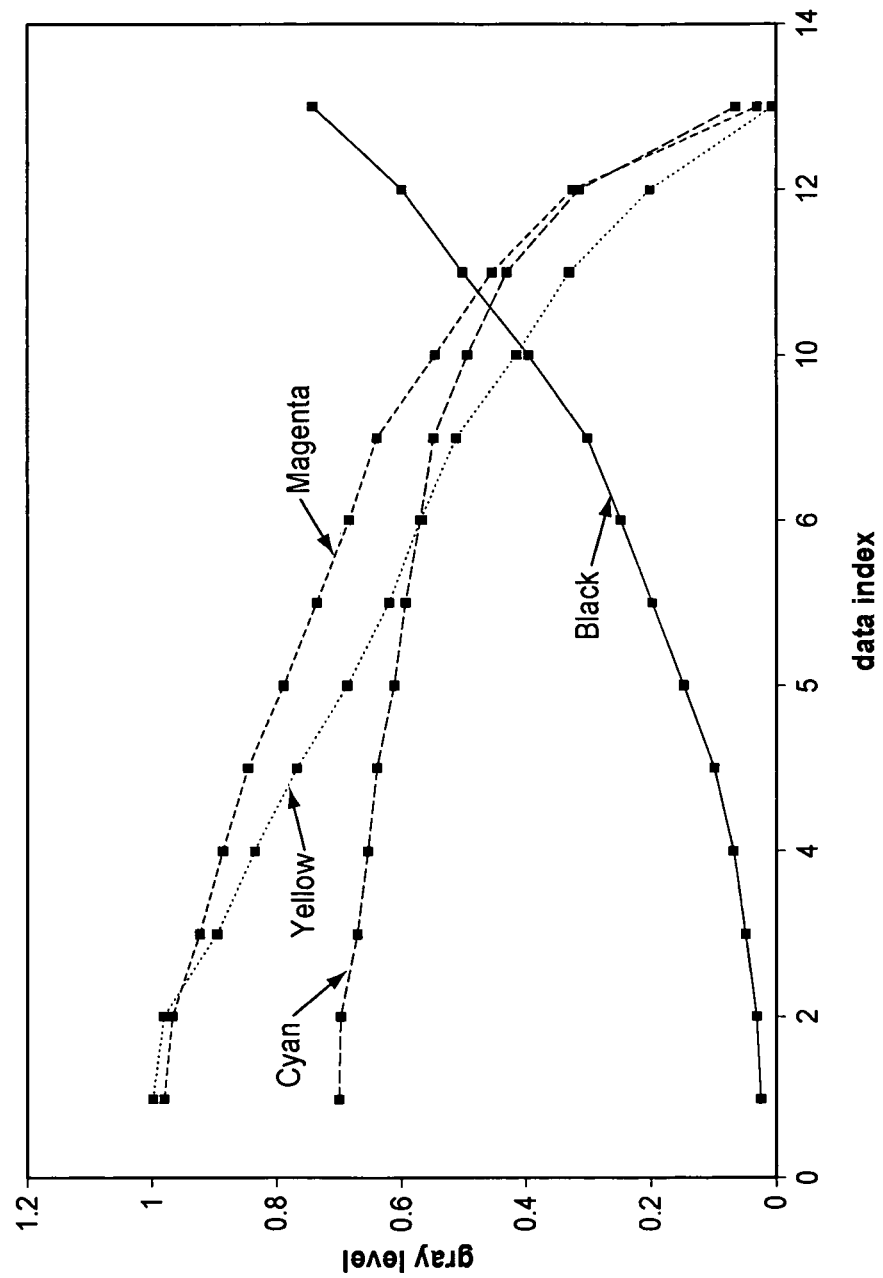
FIG. 5 is a graph of exemplary toner/ink values used in color conversion in one exemplary embodiment of the invention.

In color conversion may compose a set of discrete data points. Thus, the Exchange Algorithm may be based on the Minimax Characterization Theorem (MCT) as shown in FIG. 4. For each iteration k, the MCT adjusts a reference $\{\xi_i^* i=0; 1; \ldots; n+1\}$ and a trial approximation $p_k$ is determined. On a discrete set, f may be known on a set of points $\{x_i; i=1; 2; ::: ; m\}$. To determine a trial approximation $p_k$ in each iteration, let $$h = f(\xi_0) - p_k(\xi_0) \qquad \text{(Eq. 64)}$$

and solve $$f(\xi_i) - p(\xi_i) = (-1)^i h, i = +0, 1, 2, \ldots, n+1 \qquad \text{(Eq. 65)}$$

The iteration stops when $p_k$ satisfies the conditions in the MCT.

For solving the dual problem, the BP dual algorithm is reviewed. The BP dual algorithm is based on the standard form of the simplex method composed of three stages and introduces artificial variables $\alpha_j$ in Eq. 55 and a slack variable $\underline{\xi}$ in Eq. 56. The above dual problem thereby becomes $$\max \sum_{i=1}^m (\overline{\sigma}_i - \underline{\tau}_i) y_i \qquad \text{(Eq. 66)}$$

subject to $$\sum_{i=1}^m (\overline{\sigma}_i - \underline{\tau}_i)\phi_{ji} + \underline{\alpha}_j = 0, j = 1, 2, \ldots, n \qquad \text{(Eq. 67)}$$

$$\sum_{i=1}^m (\overline{\sigma}_i - \underline{\tau}_i) + \underline{\xi} = 1 \qquad \text{(Eq. 68)}$$

$$\underline{\xi}, \overline{\alpha}_i, -\underline{\tau}_i \geq 0, j = 1, 2, \ldots, m. \qquad \text{(Eq. 69)}$$

Denoting the column vectors formed by the coefficients of $\overline{\sigma}_i, \underline{\alpha}_i, \underline{\tau}_i,$ and $\underline{\xi}$ by $\underline{s}_i, \underline{t}_i, \underline{a}_j,$ and $\underline{w}$, then $$\underline{s_i + t_i} = 2\underline{w} \qquad \text{(Eq. 70)}$$

Then, let $\underline{b}$ denote the right-hand side of Eq. 52 such that $$\underline{b} = \underline{w} = (0\ 0 \ldots 0\ 1)^T = e_{n+1}^T. \qquad \text{(Eq. 71)}$$

The first two stages of the BP dual algorithm include determining an efficient starting point for the third stage, which is equivalent to the exchange algorithm for the linear minimax approximation. In doing so, the BP dual algorithm uses the table below:

| Basis | $\underline{s_1}$ | $\underline{s_2}$ | ... | $\underline{s_m}$ |
|---|---|---|---|---|
| $\underline{\alpha_1}$ | $\phi_{1,1}$ | $\phi_{1,2}$ | ... | $\phi_{1,m}$ |
| $\underline{\alpha_2}$ | $\phi_{2,1}$ | $\phi_{2,2}$ | ... | $\phi_{2,m}$ |
| $\vdots$ | | | | |
| $\underline{\alpha_n}$ | $\phi_{n,1}$ | $\phi_{n,2}$ | ... | $\phi_{n,m}$ |
| $\underline{\xi}$ | 1 | 1 | ... | 1 |
| Marginal Cost | $-y_1$ | $-y_2$ | ... | $-y_m$ |

Then, $\Phi$ is denoted as an m×n matrix:

$$\Phi = \begin{pmatrix} \phi_{1,1} & \phi_{2,1} & \ldots & \phi_{n,1} \\ \phi_{1,2} & \phi_{2,2} & \ldots & \phi_{n,2} \\ \ldots & & & \\ \ldots & & & \\ \phi_{1,m} & \phi_{2,m} & \ldots & \phi_{n,m} \end{pmatrix} \text{ and} \qquad \text{(Eq. 72)}$$

the rank of $\Phi$ is denoted as k.

In the first stage, the first k simplex iterations are performed. The algorithm finds the maximum residual at each iteration and reduce it to zero. The nonbasic variables that can enter the basis to become basic variables are $\overline{\sigma}_j$'s, and basic variables that can leave the basis to become nonbasic variables are restricted to $\underline{\alpha}_j$s. Basic variable $\underline{\xi}$ remains zero in the basis. At the end of stage 1, there are k residues at zero. $\overline{\sigma}_t$ that enters the basis corresponds to that with the largest absolute reduced cost (e.g., choosing the largest residual in the primal problem). The pivot may be selected from this column as the largest absolute value corresponding to an $\underline{\alpha}_j$ in the basis. At the $t^{th}$ iteration, with the corresponding $\overline{\sigma}_t$ entering the basis, there are t zero residuals. For example, $$y_t - \sum_{j=1}^n \alpha_j \phi_j(z_t) = \xi = 0. \qquad \text{(Eq. 73)}$$

In the second stage, the $(k+1)^{th}$ simplex iteration is performed and the variable $\underline{\xi}$ is forced to leave the basis. This means the error $\underline{\xi}$ in the primal problem is increased above zero. At the end of the second stage, the k+1 residuals of magnitude equal to resulting value of $\underline{\xi}$. The $(k+1)^{th}$ pivotal column may be chosen also corresponding to the largest absolute marginal cost (e.g., equivalent to choosing the largest residual in the primal problem). The $\sigma_j$'s and $\tau_j$'s are exchanged if the marginal cost is negative. If there are positive values in the first n elements in the pivotal column, these values are changed to negative by adding twice of the corresponding rows to the $(n+1)^{th}$ pivotal row and changing the sign of those original rows.

The third stage is equivalent to the exchange algorithm for a linear minimax approximation. The pivotal column may be chosen corresponding to the most negative marginal cost or a ratio selection rule. The iteration continues until all marginal cost is nonnegative. Every iteration may increase the value of ξ until ξ=e*, where e* is the minimum value in Eq. 45.

Alternatively, the BC algorithm may be used to determine the starting point for color conversion. In doing so, the primal formulation in Eq. 45 is rewritten by letting $$c_0 = (1\ 0\ 0\ 0\ \ldots\ 0)_{n+1}^T \tag{Eq. 74}$$

$$c_i = \begin{pmatrix} 1 \\ -a_i \end{pmatrix}_{n+1} \tag{Eq. 75}$$

$$c_{m+i} = \begin{pmatrix} 1 \\ +a_i \end{pmatrix}_{n+1} \tag{Eq. 76}$$

$$\delta_i = -y_i \tag{Eq. 77}$$

$$\delta_{m+i} = y_i, i = 1, 2, \ldots, m, \text{ and} \tag{Eq. 78}$$

$$v = \begin{pmatrix} \xi \\ \alpha \end{pmatrix}_{n+1} \tag{Eq. 79}$$

The above primal problem is then converted to an unconstrained optimization problem via a piecewise linear penalty function. For example, let μ>0 be a fixed parameter and define $$p(vi, \mu) = \mu c_0^T v - \sum_{j=1}^{2m} \min(0, c_j^T v - \delta_j) \tag{Eq. 80}$$

For any arbitrary v∈Rn+1, Eq. 80 can be expanded into $$p(v, \mu) = \mu c_0^T v - \sum_{j \in I^0} \min(0, c_j^T v - \delta_j) \tag{Eq. 81}$$

$$- \sum_{j \in I^+} \min(0, c_j^T v - \delta_j) \tag{Eq. 82}$$

$$- \sum_{j \in I^-} \min(0, c_j^T v - \delta_j), \tag{Eq. 83}$$

where
$I^0=I^0(v)=\{j|c_j^T v=\delta_j\}=\{j_1, j_2, \ldots, j_k\}$,
$I^+=I^+(v)=\{j|c_j^T v>\delta_j\}$, and
$I^-=I^-(v)=\{j|c_j^T v<\delta_j\}$.

For any d∈$\mathfrak{R}^{n+1}$ and any λ≧0 sufficiently small, $$p(v+\lambda d, \mu) = p(v+\mu) + \lambda \left[\mu c_0^T d - \sum_{j \in I^-} c_j^T d - \sum_{j \in I^0} \min(0, c_j^T d)\right] \tag{Eq. 84}$$

$$= p(v+\mu) + \lambda h^T d + \lambda \sum_{j \in I^0} \sigma_j^- c_j^T d, \tag{Eq. 85}$$

where $$h = \mu c_0 - \sum_{j \in I^-} c_j,$$

and $$\sigma_j^- = \sigma_j^-(d) = \begin{cases} 0 & \text{if } c_j^T d \geq 0 \\ 1 & \text{if } c_j^T d < 0, \end{cases} j \in I^0.$$

Then, define the matrix $$N=[c_{j1}, c_{j2}, \ldots, c_{jk}] \tag{Eq. 86}$$

and let $$P=I-N(N^T N)^{-1} N^T. \tag{Eq. 87}$$

The matrix P is the orthogonal projector onto the null space of $N^T$. To define search direction d such that p(v+λd, μ)<p(v, μ), $$d=-Ph \tag{Eq. 88}$$

is established. When Ph≠0, apply d defined in Eq. 88 to Eq. 85 such that $$c_j^T d = -c_j^T Ph \tag{Eq. 89}$$
$$= -c_j^T PPh$$
$$= -(Pc_j)^T Ph$$
$$= 0$$

Since P is the orthogonal projector onto the null space of $N^T$. The Eq. 84 becomes:

$$p(v+\lambda d,\mu)=p(v,\mu)+\lambda h^T d \tag{Eq. 90}$$

$$h^T d<0, \text{ and} \tag{Eq. 91}$$

$$p(v+\lambda d,\mu)<p(v,\mu). \tag{Eq. 92}$$

Thus, d serves as a descent direction for the function p.

When Ph=0, assuming columns of N are linearly independent, then $$h = \sum_{i=1}^{k} \eta_i c_{ji}. \tag{Eq. 93}$$

and Eq. 84 becomes $$p(v + \lambda d, \mu) = p(v, \mu) + \lambda \sum_{i=1}^{k} [\eta_i + \sigma_{ji}^-] c_j^T d. \tag{Eq. 94}$$

In the sub case of a: $\eta_{i*}<0$, for some $i_* \in I^0$, d is chosen such that $$c_j^T d=0, j \in I^0, j \neq i_* \tag{Eq. 95}$$

$$c_{i*}^T d=1 \tag{Eq. 96}$$

This implies that $\sigma_j^-=0<0, j \in I^0$. Because $$h^T d=\eta_{i*} c_{i*}^T d=\eta<0, \tag{Eq. 97}$$

then $$p(v+\lambda d,\mu)<p(v,\mu). \tag{Eq. 98}$$

In the sub case of b: $\eta_{i*}<0$ for all $i_* \in I^0$, if no constraints are violated, it is the optimal. Otherwise, reduce $\mu$ and start another iteration. For example,
{choose step size $\lambda$}

$$\Lambda^{(1)} \stackrel{def}{=} \left\{ \lambda \mid \lambda = \frac{\delta_j - c_j^T v}{c_j^T d}, \lambda > 0, j \in I^+ \cup I^- \right\}, \quad \text{(Eq. 99)}$$

$$\lambda = \min \Lambda^{(1)} \quad \text{(Eq. 100)}$$

and update $v = v + \lambda d$.

As an example, the $L_\infty$ norm approximation may be applied to color conversions from CMYK to CIELab and CIELab to CMY. The formulation of this color conversion in the primal form is described in the following using the CIELab to CMY color conversion by minimizing $$\xi = \xi_c + \xi_m + \xi_y \quad \text{(Eq. 101)}$$

subject to $$\xi_c + \sum_{j=1}^{n+4} \alpha_{cj} F_{cj}(z_i) \geq c_i \quad \text{(Eq. 102)}$$

$$\xi_c - \sum_{j=1}^{n+4} \alpha_{cj} F_{cj}(z_i) \geq -c_i \quad \text{(Eq. 103)}$$

$$\xi_m + \sum_{j=1}^{n+4} \alpha_{mj} F_{mj}(z_i) \geq m_i \quad \text{(Eq. 104)}$$

$$\xi_m - \sum_{j=1}^{n+4} \alpha_{mj} F_{mj}(z_i) \geq -m_i \quad \text{(Eq. 105)}$$

$$\xi_y + \sum_{j=1}^{n+4} \alpha_{yj} F_{yj}(z_i) \geq y_i \quad \text{(Eq. 106)}$$

$$\xi_y - \sum_{j=1}^{n+4} \alpha_{yj} F_{yj}(z_i) \geq -y_i, \quad \text{(Eq. 107)}$$

where
$\xi \geq 0$,
$\alpha_1, \alpha_2, \ldots \alpha_{n+4}$ are unrestricted,
$z_i = \{L, a, b\}i$, $i = 1, \ldots, m$,
$F_{ji} = [1, z_i, \phi_1(z_i), \phi_2(z_i), \ldots, \phi_n(Z_i)]_{4+n}$,
$\phi_{ji} = \phi_j(z_i)$,
$\phi_j$ is one of the RBFs, n is the number of clusters, and m is the number of color data points.

The problem may then be rewritten by minimizing $c_0^T v$ subject to $$c_j^T v \geq \delta_j, \ j = 1, 2, \ldots 6m \quad \text{(Eq. 108)}$$

where
$c_0 = (1 \ 0 \ \ldots \ 1 \ 0 \ \ldots \ 1 \ 0 \ \ldots \ 0)_{3n+15}^T$ $$v = \begin{pmatrix} \xi_c \ \alpha_{c1} \ \ldots \ \alpha_{cn} \ \xi_m \ \alpha_{m1} \ \ldots \ \alpha_{mn} \ \xi_y \ \alpha_{y1} \\ \ldots \ \alpha_{yn} \end{pmatrix}^T_{3n+15}$$

$c_i = (1 \ -\alpha_{ci} \ \ldots \ 0 \ \ldots \ 0_{2n+8})_{3n+15}^T$
$c_{m+i} = (1 \ \alpha_{ci} \ \ldots \ 0 \ \ldots \ 0_{2n+8})_{3n+15}^T$
$c_{2m+i} = (0 \ \ldots \ 0_{n+4} \ \ldots \ 1 \ \ldots \ -\alpha_{mi} \ 0 \ \ldots \ 0_{n+4})_{3n+15}^T$
$c_{3m+i} = (0 \ \ldots \ 0_{n+4} \ \ldots \ 1 \ \alpha_{mi} \ 0 \ \ldots \ 0_{n+4})_{3n+15}^T$
$c_{4m+i} = (0 \ \ldots \ 0_{2n+8} \ 1 \ -\alpha_{yi})_{3n+15}^T$
$c_{5m+i} = (0 \ \ldots \ 0_{2n+8} \ 1 \ \alpha_{yi})_{3n+15}^T$
$\delta_i = -C_i$
$\delta_{m+i} = C_i$
$\delta_{2m+i} = -M_i$
$\delta_{3m+i} = M_i$
$\delta_{4m+i} = -Y_i$
$\delta_{5m+i} = Y_i$, and
$i = 1, \ldots, m$.

The primal problem may then be divided into steps using the modified BC algorithm. For example, the primal problem with constraints may be converted to an unconstrained problem via a piecewise linear penalty function by letting $\mu > 0$ be a fixed parameter. Next, $$p(v, \mu) = \mu c_0^T v - \sum_{j=1}^{6m} \min(0, c_j^T v - \delta_j) \text{ is defined.} \quad \text{(Eq. 109)}$$

For any arbitrary $v \in \mathfrak{R}^{n+12}$, $$p(v, \mu) = \mu c_0^T v - \sum_{j \in I^0} \min(0, c_j^T v - \delta_j) - \quad \text{(Eq. 110)}$$
$$\sum_{j \in I^+} \min(0, c_j^T v - \delta_j) - \sum_{j \in I^-} \min(0, c_j^T v - \delta_j),$$

where
$I^0 = I^0(v) = \{j \mid c_j^T v = \delta_j\} = \{j_1, j_2, \ldots, j_k\}$,
$I^+ = I^+(v) = \{j \mid c_j^T v > \delta_j\}$, and
$I^- = I^-(v) = \{j \mid c_j^T v < \delta_j\}$.

Then, the sets $I^0$, $I^+$, and $I^-$ are determined and the search direction and step size are updated.

As an example of color conversion in dual for CIELab to CMY, $$\text{Maximize} \sum_{i=1}^{m} (\sigma_{ci} - \tau_{ci})c_i + (\sigma_{mi} - \tau_{mi})m_i + (\sigma_{yi} - \tau_{yi})y_i \quad \text{(Eq. 111)}$$

subject to $$\sum_{i=1}^{m} (\sigma_{ci} + \tau_{ci}) F_{C_{ji}}^T = 0 \quad \text{(Eq. 112)}$$

$$\sum_{i=1}^{m} (\sigma_{ci} - \tau_{ci}) \leq 1 \quad \text{(Eq. 113)}$$

$$\sum_{i=1}^{m} (\sigma_{Mi} + \tau_{Mi}) F_{M_{ji}}^T = 0 \quad \text{(Eq. 114)}$$

-continued $$\sum_{i=1}^{m} (\sigma_{Mi} - \tau_{Mi}) \leq 1 \qquad \text{(Eq. 115)}$$

$$\sum_{i=1}^{m} (\sigma_{Yi} - \tau_{Yi}) F_{Y,ji}^{T} = 0 \qquad \text{(Eq. 116)}$$

$$\sum_{i=1}^{m} (\sigma_{Yi} + \tau_{Yi}) \leq 1 \qquad \text{(Eq. 117)}$$

and $$\sigma_i, \tau_i \geq 0, i = 1, 2, \ldots, m, \qquad \text{(Eq. 118)}$$

where
$z_i = \{L, a, b\}_i$, $i=1, 2, \ldots, m$
$F_{ji} = [1, z_i, \phi_1(z_i), \phi_2(z_i), \ldots, \phi_n(z_i)]_{n+4}$
$\phi_{ji} = \phi_j(z_i)$,
$\phi_j$ is one of the RBFs, n is the number of clusters, and m is the number of color data points.

The CIELab to CMY conversion may then be represented by the initial simplex table:

| Basis | $s_{C_1}$ | ... $s_{C_m}$ | $s_{M_1}$ | ... $s_{M_m}$ | $s_{Y_1}$ | ... $s_{Y_m}$ |
|---|---|---|---|---|---|---|
| $\alpha_{C_1}$ | $F_{C_{1,1}}^T$ | ... $F_{C_{1,m}}^T$ | 0 | ... 0 | 0 | ... 0 |
| . | . | . | . | . | . | . |
| . | . | . | . | . | . | . |
| $\alpha_{C_n}$ | $F_{C_{n,1}}^T$ | ... $F_{C_{n,m}}^T$ | 0 | ... 0 | 0 | ... 0 |
| $\alpha_{M_1}$ | 0 | ... 0 | $F_{M_{1,1}}^T$ | ... $F_{M_{1,m}}^T$ | 0 | ... 0 |
| . | . | . | . | . | . | . |
| $\alpha_{M_n}$ | 0 | ... 0 | $F_{M_{n,1}}^T$ | ... $F_{M_{n,m}}^T$ | 0 | ... 0 |
| $\alpha_{Y_1}$ | 0 | ... 0 | 0 | ... 0 | $F_{Y_{1,1}}$ | ... $F_{Y_{1,m}}$ |
| . | . | . | . | . | . | . |
| $\alpha_{Y_n}$ | 0 | ... 0 | 0 | ... 0 | $F_{Y_{n,1}}^T$ | ... $F_{Y_{n,m}}^T$ |
| $w_C$ | 1 | ... 1 | 0 | ... 0 | 0 | ... 0 |
| $w_M$ | 0 | ... 0 | 1 | ... 1 | 0 | ... 0 |
| $w_Y$ | 0 | ... 0 | 0 | ... 0 | 1 | ... 1 |
| Marginal Cost | $-C_1$ | ... $-C_m$ | $-M_1$ | ... $-M_m$ | $-Y_1$ | ... $-Y_m$ | and the rank of the matrix $F_{n \times m}$, k is thereby determined.

Thereafter, the first step BP simplex algorithm may be performed via k simplex iterations for each of $F_{Cn \times m}$ for the cyan component, $F_{Mn \times m}$ for the magenta component, and $F_{Yn \times m}$ for the yellow component. The vectors $s_C$ are allowed to enter the basis and the vectors $\alpha_C$ can leave the basis for $F_{Cn \times m}$. The vectors $s_M$ are allowed to enter the basis and the vectors $\alpha_M$ can leave the basis for $F_{Mn \times m}$. The vectors $s_Y$ are allowed to enter the basis and the vectors $\alpha_Y$ can leave the basis for $Y_{n \times m}$.

The second step of the BP simplex algorithm may be performed by forcing $\xi_C$, $\xi_M$, and $\xi_Y$ to leave the basis. The corresponding vectors entering the basis are sC, $s_M$, and $s_Y$ respectively. If the corresponding marginal cost of $s_C$, $s_M$, or $s_Y$ is positive, then si is changed to $t_i$ using $$t_i = 2w3_{n+4} - s_i,$$

where
$w_C = (0\ 0\ \ldots\ 0\ 1\ 0\ 0\ 0)^T = e_{3n+1}^T$,
$w_M = (0\ 0\ \ldots\ 0\ 0\ 1\ 0\ 0)^T = e_{3n+2}^T$, and
$w_Y = (0\ 0\ \ldots\ 0\ 0\ 0\ 1\ 0)^T = e_{3n+3}^T$.

If $s_i$ is the pivotal column, r is the row vector of pivotal row. For any $j^{th}$ row vector $r_j$ containing $s_{ij} > 0$, where $j \neq 3n+1$ for $F_{Cn \times m}$, $j \neq 3n+2$ for $F_{Mn \times m}$, and $j \neq 3n+3$ for $F_{Yn \times m}$, change r to $r + 2r_j$ and change $r_j$ to $-r_j$. The third step of the BP simplex iterations may then be performed until all the marginal costs are non-negative.

Color Conversion Using the $L_1$ Norm Approximation

Color conversion in neutral color areas plays an important role in color reproduction quality. The human visual system (HVS) is sensitive to color changes in neutral color areas. Additionally, the color conversion errors due to machine stability, paper uniformity, and instrument accuracy are more profound relative to the human color difference tolerances. Thus, there are more chances for the existences of outliers using color conversion. A color conversion should minimize the negative impact of outliers. The $L_1$ norm approximation may assist in the region due to the robustness to outliers.

Among all the $L_1$ algorithms, the Barrodale and Roberts' primal algorithm (BR algorithm) is relatively robust. Similar to the problem setup for the $L_\infty$, the overdetermined linear system of the general $L_1$ approximation problem may be stated as follows:

$$Ax = b, \qquad \text{(Eq. 119)}$$

where
$A = [a_1, a_2, \ldots, a_n] \in \Re^{m \times n}$, ($m > n \geq 2$) and
$b^T = [\beta_1, \beta_2, \ldots, \beta_m] \in \Re$.

The $L_1$ norm approximation is used to determine vector $x \in \Re^n$ such that $$\|Ax - b\|_1 = \sum_{i=1}^{m} \sum_{j=1}^{n} |a_j^T x_i - \beta_i| \qquad \text{(Eq. 120)}$$

is minimized. In this regard, L is a linear space spanned by function $\phi_i$ $$L = <\phi_1(z), \phi_2(z), \ldots, \phi_n(z)>, \qquad \text{(Eq. 121)}$$

where each $\phi_i$ is continuous on [a,b], i=1, ..., n. The function $\phi$ may be expressed as $$\phi(z) = \sum_{i=1}^{n} \alpha_i \phi_i(z) \in L, \qquad \text{(Eq. 122)}$$

where $z \in [a,b] \subset \mathfrak{R}^k$.

Given $m > n \geq 2$, data points $(z_i, y_i)$, $\alpha = (\alpha_1, \ldots \alpha_n)$ is determined to minimize $$e(\alpha_1 \ldots \alpha_n) = \left\| y_i - \sum_{j=1}^{n} \alpha_j \phi_j(z_i) \right\|_1 \qquad \text{(Eq. 123)}$$

$$= \sum_{j=1}^{m} \left| y_j - \sum_{j=1}^{n} \alpha_j \phi_j(z_i) \right| \qquad \text{(Eq. 124)}$$

The equation then becomes:

$$x = a \qquad \text{(Eq. 125)}$$

$$A = \begin{pmatrix} \phi_1(z_1) & \phi_2(z_1) & \ldots & \phi_n(z_1) \\ \ldots & & & \\ \ldots & & & \\ \phi_1(z_m) & \phi_2(z_m) & \ldots & \phi_n(z_m) \end{pmatrix}$$

$$b = (y_1 y_2 \ldots y_m)^T$$

In the RBF form, the function becomes $$\phi(z) = \alpha_0 + \sum_{p=1}^{k} \alpha_p z(p) - \sum_{j=n+k}^{n+k} \alpha_j \phi(\|z - c_j\|), \qquad \text{(Eq. 126)}$$

where $x = (\alpha_0, \alpha_1, \ldots, \alpha_k, \alpha_{k+1}, \ldots, \alpha_{n+k})$ and $$A = \begin{pmatrix} 1 & z(1) & z_1(2) & \ldots & z_1(k) & \phi_1(z_1) & \phi_2(z_1) & \ldots & \phi_n(z_1) \\ \ldots & & & & & & & & \\ \ldots & & & & & & & & \\ \ldots & & & & & & & & \\ 1 & z_m(1) & z_m(2) & \ldots & z_m(k) & \phi_1(z_m) & \phi_2(z_m) & \ldots & \phi_n(z_m) \end{pmatrix}.$$

The $L_1$ and $L_\infty$ norms in C[a, b] and in $R_n$ are not strictly convex. Accordingly, A is a linear subspace of either the $L_1$ or the $L_\infty$ normed linear space, as the uniqueness of best approximations from A to f depends on properties of A and f. p* in A may be the better $L_1$ approximation function to f. A sign function is thus defined as:

$$s*(x) = \begin{cases} -1, & f(x) < p*(x) \\ 0, & f(x) = p*(x) \\ 1, & f(x) > p*(x) \end{cases} \qquad \text{(Eq. 127)}$$

A sufficient condition for the function p* is the $L_1$ approximation from A to f which may be defined by letting A be a linear subspace of C[a, b], f be any function in C[a, b], and p* be any element of A, such that the set $$L = \{x : f(x) = p*(x), a \leq x \leq b\} \qquad \text{(Eq. 128)}$$

is either empty or is composed of a finite number of intervals and discrete points. Then p* provides an $L_1$ norm approximation form A to f, if the inequality $$|\int_a^b s*(x) p(x) dx| \leq \int_L |p(x)| dx \qquad \text{(4.7) (Eq. 129)}$$

is satisfied for all p in A, where s* is the function of Eq. 127.

For discrete $L_1$ approximation, let the function values $\{f(x_t); t=1, 2, \ldots m\}$ and the fixed positive weights be $\{w_t; t=1, 2, \ldots, m\}$. A is a linear space of functions that may be defined on the point set $\{x_t; t=1, 2, \ldots, m\}$, and p* is any element of A. Then, $\epsilon$ contains the points of $\{x_t; t=1, 2, \ldots, m\}$ that satisfy the condition $$p*(x_t) = f(x_t) \qquad \text{(Eq. 130)}$$

and s* is the sign function $$s*(x) = \begin{cases} -1, & f(x_t) < p*(x_t) \\ 0, & f(x_t) = p*(x_t) \\ 1, & f(x_t) > p*(x_t) \end{cases} \qquad \text{(Eq. 131)}$$

t=1, 2, ..., m. p* becomes the function in A that minimizes the expression $$\sum_{t=1}^{m} w_t |f(x_t) - p(x_t)|, \ p \in A \qquad \text{(Eq. 132)}$$

if the inequality $$\left| \sum_{t=1}^{m} w_t s*(x_t) p(x_t) \right| \leq \sum_{x_t \in L}^{m} w_t |p(x_t)| \qquad \text{(Eq. 133)}$$

holds for all p in A.

In order to improve the discrete $L_1$ approximation p*, the inequality in Eq. 133 is tested to be satisfied for every element p in A. An optimal function p* can be obtained by searching for suitable interpolation points in L. For example, let the function values $\{f(x_t); t=1, 2, \ldots, m\}$ and the fixed positive weights be $\{w_t; t=1, 2, \ldots, m\}$. Then, A is a linear subspace of $R^m$, where the component of each vector p in A have the values $\{p(x_t); t=1, 2, \ldots, m\}$. An element p* in A minimizes Eq. 132, and the property that the zero vector is the element p in A that satisfies the conditions $\{p(x_t)=0; x_t*L\}$, where the set L is defined in Eq. 128

With this is mind, the discrete $L_1$ approximation calculation becomes a linear programming problem. For example with $\phi=\{\phi_i; i=0, 1, \ldots, n\}$ as a basis of the space A of approximation, the Eq. 133 becomes $$\sum_{t=1}^{m} w_t \left| y_t - \sum_{i=0}^{n} \lambda_i \phi_i(x_t) \right| \qquad \text{(Eq. 134)}$$

where $y_t$ is the output value corresponding to each $x_t$. Define the bounds $\{u_t \geq 0\}$ and $\{v_t \geq 0\}$ may be defined such that $$-v_t \leq y_t - \sum_{i=0}^{n} \lambda_i \phi_i(x_t) \leq u_t \qquad \text{(Eq. 135)}$$

for $\{t=1, 2, \ldots, m\}$. Then the linear programming problem is $$\text{Minimize} \sum_{t=1}^{m} w_t(u_t + v_t) \qquad \text{(Eq. 136)}$$

subject to $$-v_t \leq y_t - \sum_{i=0}^{n} \lambda_i \phi_i(x_t) \leq u_t, t = 1, 2, \ldots m \qquad \text{(Eq. 137)}$$

$$u_t \geq 0$$

$$v_t \geq 0$$

for $t=1, 2, \ldots m$.

The algorithm may be described as:

$$f_i - \sum_{j=1}^{n} \alpha_j \phi_{j,i} = u_i - v_i, \qquad \text{(Eq. 138)}$$

where $\{u_i, v_i: i=1, 2, \ldots, m\}$ are nonnegative variables. The nonnegative variables $\{b_j, c_j: j=1, 2, \ldots, n\}$ and the weights $a_j = b_j - c_j$ may then be defined. The primal problem becomes $$\text{Minimizing} \sum_{i=1}^{m} (u_i + v_i) \qquad \text{(Eq. 139)}$$

subject to $$f_i = \sum_{j=1}^{n} (b_j - c_j) \phi_{j,i} + u_i - v_i, i = 1, 2, \ldots, m \qquad \text{(Eq. 140)}$$

and $$b_j, c_j, u_i, v_i \geq 0. \qquad \text{(Eq. 141)}$$

The algorithm may be implemented in two stages: For example, for the first n iterations, the pivotal columns are restricted to $b_j$ and $c_j$. The vector entering the basis is the one with the largest nonnegative marginal cost, $$\left( \text{e.g.,} \sum_{i=1}^{m} \phi_{j,i} \right).$$

The vector leaving the basis is chosen among $v_i$ and $u_i$ for the one causing the maximum reduction in the objective function. Next, the nonbasic $u_i$ or $v_i$ are interchanged with the basic $u_i$ or $v_i$. Neither $b_j$ or $c_j$ is allowed to leave the basis. The criteria for selecting vectors leaving and entering the basis are the same as that in the first stage. Otherwise, the basic vectors $b_j$ or $c_j$ are interchanged with the corresponding nonbasic vectors $c_j$ or $b_j$. On making this algorithm efficient, the vector chosen to leave the basis is the one that causes the maximum reduction in the objective function.

On the Multidimensional Neutral Color Conversion Problem, the BR algorithm may be applied to the neutral color conversion by letting $z_i = \{(L, a, b)_i, i=1, 2, \ldots, m\}$. As an example, the color conversion from CIELab to CMY is formulated:

$$\text{Minimizing} \xi = \sum_{i=1}^{m} u_{ci} + v_{ci} + u_{mi} + v_{mi} + u_{yi} + v_{yi} \qquad \text{(Eq. 142)}$$

subject to $$\sum_{j=1}^{n+4} (a_{cj} - b_{cj}) F_{cj}(z_i) + u_{ci} + v_{ci} = C_i \qquad \text{(Eq. 143)}$$

$$\sum_{j=1}^{n+4} (a_{mj} - b_{mj}) F_{mj}(z_i) + u_{mi} + v_{mi} = M_i \qquad \text{(Eq. 144)}$$

$$\sum_{j=1}^{n+4} (a_{yj} - b_{yj}) F_{yj}(z_i) + u_{yi} + v_{yi} = Y_i \qquad \text{(Eq. 145)}$$

where $a_{cj}, b_{cj}, a_{mj}, b_{mj}, a_{yj}, b_{yj}, u_i, v_i \geq 0$ and $F_{ji} = [1, z(i), \phi_1(z_i), \phi_2(z_i), \ldots, \phi_n(z_i)]_{n+4}$ for the C, M, and Y components respectively.

When performing the two-stage BR algorithm, the vectors relating to C, M, and Y are generally be exchanged with the vectors of C, M, and Y respectively. This yields an exemplary condensed initial simplex table for CIELab to CMY conversion as shown below.

| Basis | R | $b_{C_1}$ | ... | $b_{C_n}$ | $b_{M_1}$ | ... | $b_{M_n}$ | $b_{Y_1}$ | ... | $b_{Y_n}$ |
|---|---|---|---|---|---|---|---|---|---|---|
| $u_{C_1}$ | $C_1$ | $F_{C_{1,1}}$ | ... | $F_{C_{n,1}}$ | 0 | ... | 0 | 0 | ... | 0 |
| ⋮ | ⋮ | | | ⋮ | | | ⋮ | | | ⋮ |
| $u_{C_m}$ | $C_m$ | $F_{C_{1,m}}$ | ... | $F_{C_{n,m}}$ | 0 | ... | 0 | 0 | ... | 0 |
| $u_{M_1}$ | $M_1$ | 0 | ... | 0 | $F_{M_{1,1}}$ | ... | $F_{M_{t,1}}$ | 0 | ... | 0 |
| ⋮ | ⋮ | | | | ⋮ | | ⋮ | | | ⋮ |
| $u_{M_n}$ | $M_n$ | 0 | ... | 0 | $F_{M_{1,n}}$ | ... | $F_{M_{t,n}}$ | 0 | ... | 0 |
| $u_{Y_1}$ | $Y_1$ | 0 | ... | 0 | 0 | ... | 0 | $F_{Y_{1,1}}$ | ... | $F_{Y_{n,1}}$ |
| ⋮ | ⋮ | | | | | | | ⋮ | | ⋮ |
| $u_{Y_n}$ | $Y_n$ | 0 | ... | 0 | 0 | ... | 0 | $F_{Y_{1,n}}$ | ... | $F_{Y_{n,m}}$ |
| Marginal Cost | $\sum_{i=1}^{m}(C_i+M_i+Y_i)$ | $\sum_{i=1}^{m} F_{C_{1,i}}$ | ... | $\sum_{i=1}^{m} F_{C_{n,i}}$ | $\sum_{i=1}^{m} F_{M_{1,i}}$ | ... | $\sum_{i=1}^{m} F_{M_{n,i}}$ | $\sum_{i=1}^{m} F_{Y_{1,i}}$ | ... | $\sum_{i=1}^{m} F_{Y_{n,i}}$ |

One Dimensional Color Manifolds in the CMYK Color Space

One of the more difficult and challenging tasks in color printing is reducing the cost of printing while maintaining quality. Traditionally, the printer color conversion from CMY (or CIELab) to CMYK has been achieved (UCR) and (UCA). As discussed, UCR is the process of removing an equal amount of cyan, magenta, and yellow, and adding the same amount of black. More explicitly, the color components are defined as:

$$CMY=\{C,M,Y\},\ CMYK=\{C,M,Y,K\},\ and\ Lab=\{L,a,b\}.$$

The smallest value of the C, M, Y components is formed as $K=\min\{C,M,Y\}$
and K is used to convert a CMY value to a CMYK value as follows:

$$C'=C-K,\ M'=M-K,\ and\ Y'=Y-K.$$

Because of the nonlinearity of toners/inks, this UCR model is in accurate, and introduces unacceptable color conversion errors. Colors resulting from the UCR process are generally dull, muddy, and hue shifted. To mitigate this problem, the UCR process is followed by the UCA correction which consists of adding a relatively small amount of cyan, magenta, and yellow back to the C', M', Y' values respectively to make colors richer and less hue shifted. However, this method is empirical and labor intensive and the conversion error is still quite large.

A solution to this color toner/ink reduction problem consists of approximating a nonlinear continuous and differentiable functions mapping from CIELab to CMY and CMYK to CIELab. To optimize CMY to CMYK conversion, it is assumed that accurate continuous functions describing CMYK to CIELab conversion and CIELab to CMY conversion are as follows:

$$g(L,a,b) \to (C,M,Y) \in (\Re^-,\Re^+,\Re^+)\ and\ f(C,M,Y) \to (L,a,b).$$

For a CIELab value within the printer gamut, $Lab_0=(L_0,a_0,b_0)$, $g(L_0,a_0,b_0)=(C_0,M_0,Y_0)$. If $C_0>0$ & $M_0>0$ & $Y_0>0$, a $(C_0',M_0',Y_0',K_0')$ value may be determined such that $$\frac{f(C_0',M_0',Y_0',K_0')}{x} \approx \frac{(L_0,a_0,b_0)}{Y}.$$

Then, the CMYK value $x_n=(C_n',M_n',Y_n',K_n')$ may be approximated iteratively such that, for n large enough, $$\|f(x_n)-y_n\| \leq \epsilon \qquad (Eq.\ 146)$$

for some prescribed tolerance $\epsilon$. Newton's method may be used if an initial point is close to the minimizer algorithm. To determine an initial point for Newton's method a value $x_0$ is determine such that $$err=\|f(x_0)-y_0\| \leq tol, \qquad (Eq.\ 147)$$

where tol is an initial acceptable tolerance.

One of the problems in traditional GCR algorithms is that the CIELab value having equal amounts of cyan, magenta, and yellow toner/ink is often not equal to the CIELab value of that same amount of black toner/ink. In other words, the CIELab value of K generally corresponds to unequal amounts of C, M, Y. If the equal amount of C, M, Y, K values are used as the initial point to Newton's algorithm, the above inequality may not be satisfied. A better initial point may be obtained by removing unequal amounts of cyan, magenta, and yellow from the CMY value respectively, and adding the K value. The maximum error using this process may be improved from the typical UCR error value of 14.42 to 10.50.

On this region, for any K, the associated CIELab value is computed using $$f(0,0,0,K) \to (L^K,a^K,b^K) \qquad (Eq.\ 148)$$

Then, the CMY value corresponding to this K is determined using $$g(L^K,a^K,b^K) \to (C^K,M^K,Y^K) \qquad (Eq.\ 149)$$

to establish an equivalence $$K \Leftrightarrow (C^K,M^K,Y^K). \qquad (Eq.\ 150)$$

This repeated for a sequence of K values span the range of (0, 1). For any given (C, M, Y) value, there exists a maximum $K_p$ value whose corresponding $(C^{K_p},M^{K_p},Y^{K_p})$ satisfies $$C=C^{K_p}\ or\ M=M^{K_p}\ or\ Y=Y^{K_p} \qquad (Eq.\ 151)$$

A sequence of K values is determined such that $$K=\{K_i \leq K_p,\ i=1,2,\ldots,p\}. \qquad (Eq.\ 152)$$

The corresponding $(C^{Ki}, M^{Ki}, Y^{Ki})$'s can also be removed from the (C, M, Y) value. Then, the CMY value (C, M, Y) is converted to a sequence of CMYK values such that $$CMYK' = \{(C^{Ki'}, M^{Ki'}, Y^{Ki'}), i=1,2,\ldots,p\}, \quad \text{(Eq. 153)}$$

where $C^{Ki'} = C - C_{K_i}$, $M^{Ki'} = M - M_{K_i}$, and $Y^{Ki'} = Y - Y_{K_i}$, which yields an optimizing GCR algorithm.

Given an initial CMY, the optimized GCR algorithm may determine an associated (C', M', Y', K') such that the quality $$\|f(C',M',Y',K') - f(C,M,Y,0)\| \quad \text{(Eq. 154)}$$

is relatively small. With an initial point close enough to the minimizer, the multidimensional Newton's method may be used to determine the optimal value of (C', M', Y', K'). For example, let $$f = \begin{pmatrix} f_L \\ f_a \\ f_b \end{pmatrix}, \; x = \begin{pmatrix} C \\ M \\ Y \\ K \end{pmatrix}, \; y = \begin{pmatrix} L \\ a \\ b \end{pmatrix}, \; y = \begin{pmatrix} L_0 \\ a_0 \\ b_0 \end{pmatrix}, \quad \text{(Eq. 155)}$$

where $y_0$ is the corresponding CIELab value of the original CMY color (e.g., the desired CIELab value for the optimizer of the (C', M', Y', K')). f(x) then represents the mapping from CMYK to CIELab and expresses as a RBF. For example, $$f_j(x) = A_j x + a_{j0} + \sum_{i=1}^{N} w_{ji} \phi_j(\|x - c_i\|), \quad \text{(Eq. 156)}$$

where j=1, 2, 3 correspond to $\{f_L, f_a, f_b\}$. Then, $f(x+h) \approx f(x) + f'(x) h$, where $f'(x)$ is in the form of Jacobian matrix $$J = f'(x) = \begin{pmatrix} \partial f_L/\partial C & \partial f_L/\partial M & \partial f_L/\partial Y & \partial f_L/\partial K \\ \partial f_a/\partial C & \partial f_a/\partial M & \partial f_a/\partial Y & \partial f_a/\partial K \\ \partial f_b/\partial C & \partial f_b/\partial M & \partial f_b/\partial Y & \partial f_b/\partial K \end{pmatrix}. \quad \text{(Eq. 157)}$$

For each iteration k, $x_{k+1} = x_k - J(x_k)^{-1}(f(y_k) - f(y_0))$. This iteration stops when $\|(f(x_n) - y_0)\| \leq 10^{-12}$.

The dimension of the Jacobian matrix is generally 3×4. In order to change it to an invertible Jacobian matrix. The black value of the (C, M, Y, K) color remains unchanged. The Jacobian matrix in Equation 149 is then changed to $$J = f'(x) = \begin{pmatrix} \partial f_L/\partial C & \partial f_L/\partial M & \partial f_L/\partial Y \\ \partial f_a/\partial C & \partial f_a/\partial M & \partial f_a/\partial Y \\ \partial f_b/\partial C & \partial f_b/\partial M & \partial f_b/\partial Y \end{pmatrix} \quad \text{(Eq. 158)}$$

Solving the Equation 149 using SVD obtains $$x_{k+1} = \begin{pmatrix} C_{k+1} \\ M_{k+1} \\ Y_{k+1} \\ K \end{pmatrix}. \quad \text{(Eq. 159)}$$

At each iteration, check if the C, M, Y values in the converted (C, M, Y, K) analyzer to determine whether they are in the range of [0, 1], (e.g., if $x_{k+1}^i \geq 1$ or $x_{k+1}^i \leq 0$, where i=1, 2, 3 correspond to C, M and Y component respectively). If the value of the $i^{th}$ component is out of the range, $$x_{k+1}^i = \begin{cases} 1, & x(i) \geq 1 \\ 0, & x(i) \leq 0. \end{cases} \quad \text{(Eq. 160)}$$

The $i^{th}$ component remains unchanged for the rest of the iterations. The column that corresponds to this component from the Jacobian matrix J is then removed, and the constraint on the black component is relaxed by adding the partial derivatives with respect to black in the matrix J. For example, if $x(2) \geq 1$, the magenta component is removed. The Jacobian matrix $J_{k+1}$ becomes $$J_{k+1} = \begin{pmatrix} \partial f_L/\partial C & \partial f_L/\partial M & \partial f_L/\partial Y \\ \partial f_a/\partial C & \partial f_a/\partial M & \partial f_a/\partial Y \\ \partial f_b/\partial C & \partial f_b/\partial M & \partial f_b/\partial Y \end{pmatrix} \quad \text{(Eq. 161)}$$

and $$x_{k+1} = \begin{pmatrix} C_{k+1} \\ 1.0 \\ Y_{k+1} \\ K_{k+1} \end{pmatrix}. \quad \text{(Eq. 162)}$$

Generally, any given CMY value of (C>0 & M>0 & Y>0) converges to a CMYK value with the CIELab value difference practically zero.

As described above, each black level K, (e.g., CMYK=(0, 0, 0, K) can be mapped to a CMY value of $(C_k, M_k, Y_k)$. For any CMY value (C>0 & M>0 & y>0), there exists a set of values $\{K_i, i=1, 2, \ldots, p\}$ in which a corresponding $\{C^{ki}, M^{ki}, Y^{ki}, i=1, 2, \ldots, p\}$ may be removed from C, M, and Y, (e.g., $C \geq C^{ki} > M \geq M^{ki}$ & $Y \geq Y^{ki}$, i=1, 2, . . . , p). Generally, for one CMY value, there exists a set of CMYK values $\{C - C^{ki}, M - M^{ki}, Y - Y^{ki}, K_i, i=1, 2, \ldots, p\}$ that can be used for the initial points to the multidimensional Newton's optimization algorithm. Thereafter, the set of values $f^{-1}(L_0, a_0, b_0)$ may be determined as a one-dimensional manifold based on the pre-image theorem.

For example, $X \to Y$ be a smooth map between manifolds. Thus, a point is a regular value off if for all $x: x \in f^{-1}(y)$ and the map $df: T_x X \to T_y Y$ is subjective. Here, $T_x X$ and $T_y Y$ are the tangent spaces of X and Y at the points x and y. Again, with $f: X \to Y$ being a smooth map, $y \in Y$ may be a regular value of f. Accordingly, $x: x \in f^{-1}(y)$ is a submanifold of X with dim $f^{-1}(y) = \dim X - \dim Y$.

For color conversion, A={set of elements of CMYK} and B={set of elements of CIELab}. A function $f = (f_L, f_a, f_b)$ that maps A to B is in the form of RBFs described in Eq. 156 and f is continuous and differentiable. For a CIELab value $y \in B$, if the Jacobian matrix described in Eq. 157 at y is full rank, (e.g., rank is equal to 3), then y is a regular point of f. Generally, there exists a manifold $S = f^-(y)$, $S \subseteq A$ with the dimension of one.

These one-dimensional manifolds based on the pre-image theorem are then determined. For example, for any CIELab value y that is inside the printer gamut, obtain the CMY value using $g(y) \to (C, M, Y)$. Then, determine whether min(C, M, Y)=0. If so y is not a regular point since its Jacobian matrix will be rank deficient. Otherwise, if min(C, M, Y)>0, the initializing algorithm is performed to obtain the sequence of the CMYK value CMYK' described in Eq. 155.

The Jacobian matrix is monitored at each starting point to decide if y is a regular point. If y is a regular point, the optimized GCR algorithm is performed to obtain optimized value for each starting point, (e.g., obtain the 1-dimensional manifold $S \subseteq A$, and $S = f^{-1}(y)$). When there exists a level set of CMYK values $S = f^{-1}(y)$ that correspond to the same CIELab value, $y \in B$, the optimal solution for the toner/ink selection can be obtained for a given objective function.

The objective function can be toner/ink cost based. That is, the objective function is to minimize the cost of printing or toner/ink coverage. For example, min(C+M+Y+K) is the minimum amount of C+M+Y+K obtained from the level set. The data in FIG. 5 for the original CMY value {0.7, 1, 1} results in the total amount of toner/ink being 270%. The minimum total amount of toners/inks in the CMYK level set is 84.2% corresponding the CMYK value of {0.066186, 0.031126, 0, 0.74461} resulting in a total toner savings of 185.8%. Because values in a CMYK level set correspond to the same CIELab value, the toner savings is achieved with little or no quality degradation.

Color Conversion with Ink Limitations

Another challenging task in color printing relates to the limitation of the amount of toner/ink coverage on a page to avoid excessive bleed-through. This task is particularly important for inkjet printing. When there exists a limit for the maximum amount of toner/ink coverage allowed per spot color printing, color conversion in highly saturated color regions or dark neutral color regions are generally affected. The color conversion affected by this limit includes the CIELab to CMY color conversion. The $L_1$ norm approximation may provide a suitable solution for solving the neutral color conversion problem and the $L_\infty$ approximation may be suitable for color conversion in saturated color regions. For both approaches, RBFs with linear programming may be employed. The existence of a toner/ink limitation may be added as a constraint in the linear programming problem formulations. For example, the color conversion with the toner/ink limitation problem may now be formulated via both $L_1$ and $L_\infty$ approximation algorithms. The $L_1$ algorithm may be a modified BR primal algorithm with an added constraint while the $L_\infty$ algorithm may be developed based on the BP dual algorithm to extend the three-stage algorithm to a four-stage algorithm.

To analyze ink limitation problem using the $L_1$ approximation, g(z) is used to represent the mapping from CIELab to CMY in the form of an RBF as:

$$g_k(z_j) = A_k z_j + \alpha_{k0} + \sum_{i=1}^{n} \alpha_{ki} \phi_k(\|z_j - c_i\|), \quad (\text{Eq. 163})$$

where k=1, 2, 3 corresponding to $\{g_C, g_M, g_Y\}$. Then, $z_j = \{L, a, b\}_j$, where i=1, 2, ..., n and j=1, 2, ..., m. The dimension of $A_k$ is 1×3 corresponding to the dimension of the domain. The dimension of $a_0$ is 1. Therefore, there are n+4 coefficients in such that Eq. 163 may be written as:

$$g_k(z_j) = \underbrace{(z_j, 1, \phi_k(\|z_j - c_1\|), \phi_k(\|z_j - c_2\|), \ldots, \phi_k(\|z_j - c_i\|))}_{F_k(z_j)} \quad (\text{Eq. 164})$$

$$\begin{pmatrix} A_k^T \\ a_{k0} \\ a_{k1} \\ \alpha_{k2} \\ \ldots \\ \alpha_{kn} \end{pmatrix} \begin{matrix} \\ \\ \\ n+4 \\ \\ \\ \end{matrix}$$
$$\underbrace{\phantom{xxxxx}}_{w_k}$$

$$= \sum_{i=1}^{n+4} w_{ki} F_{ki}(z_i). \quad (\text{Eq. 165})$$

The $L_1$ error for each data point of component of C, M and Y using nonnegative variables are defined as $$g_k(z_i) - \sum_{i=1}^{n+4} w_{ki} F_{ki}(z_i) = u_{kj} - v_{kj} \quad (\text{Eq. 166})$$

and the coefficients for each component using nonnegative variables are defined as $w_{ki} = b_{ki} - c_{ki}$, where $u_{kj}, v_{kj}, b_{ki}, c_{ki} \geq 0$. The primal linear programming problem in the $L_1$ sense may be illustrated by the constraint of the toner/ink limit applying to the color data with a toner/ink summation exceeding the total amount of toner or ink (e.g., C+M+Y+K>L, where L is the total amount of toner or ink). In this regard, $$\text{Minimize } \xi = \sum_{j=1}^{m} u_{1j} + v_{1j} + u_{2j} + v_{2j} + u_{3j} + v_{3j} \quad (\text{Eq. 167})$$

subject to $$\sum_{i=1}^{n+4} (a_{1j} - b_{1j}) F_{1j}(z_j) + u_{1j} + v_{1j} = C_j \quad (\text{Eq. 168})$$

$$\sum_{i=1}^{n+4} (a_{2j} - b_{2j}) F_{2j}(z_j) + u_{2j} + v_{2j} = M_j \quad (\text{Eq. 169})$$

$$\sum_{i=1}^{n+4} (a_{3j} - b_{3j}) F_{3j}(z_j) + u_{3j} + v_{3j} = Y_j \quad (\text{Eq. 170})$$

$$\sum_{i=1}^{n+4} (a_{1j} - b_{1j}) F_{1j}(z_{jl}) + \quad (\text{Eq. 171})$$
$$\sum_{i=1}^{n+4} (a_{2j} - b_{2j}) F_{2j}(z_{jl}) + \sum_{i=1}^{n+4} (a_{3j} - b_{3j}) F_{3j}(z_{jl}) \leq L,$$

where $J = \{j_1 | C_{jl} + M_{jl} + Y_{jl} > L\} \subseteq \{i=1, 2, \ldots, m\}$, $u_{kj}, v_{kj}, b_{ki}, c_{ki} \geq 0$, k=1, 2, 3, i=1, 2, ..., n, and j=1, 2, ... m, With this in mind, a condensed initial simplex table for the CIELab to CMY conversion with the toner/ink limitation L is established in the table below where p denotes the number of color data points that exceed the toner/ink limit. The slack variables $s_i$'s are then added in Eq. 171.

| Basis | R | $b_{C_1}$ | ... | $b_{C_n}$ | $b_{M_1}$ | ... | $b_{M_n}$ | $b_{Y_1}$ | ... | $b_{Y_n}$ |
|---|---|---|---|---|---|---|---|---|---|---|
| $u_{C1}$ | $C_1$ | $F_{1_{1,1}}$ | ... | $F_{1_{n,1}}$ | 0 | ... | 0 | 0 | ... | 0 |
| ⋮ | ⋮ | | ⋮ | | | ⋮ | | | ⋮ | |
| $u_{Cm}$ | $C_m$ | $F_{1_{1,m}}$ | ... | $F_{1_{n,m}}$ | 0 | ... | 0 | 0 | ... | 0 |
| $u_{M1}$ | $M_1$ | 0 | ... | 0 | $F_{2_{1,1}}$ | ... | $F_{2_{n,1}}$ | 0 | ... | 0 |
| ⋮ | ⋮ | | ⋮ | | | ⋮ | | | ⋮ | |
| $u_{Mn}$ | $M_m$ | 0 | ... | 0 | $F_{2_{1,n}}$ | ... | $F_{2_{n,m}}$ | 0 | ... | 0 |
| $u_{Y1}$ | $Y_1$ | 0 | ... | 0 | 0 | ... | 0 | $F_{3_{1,1}}$ | ... | $F_{3_{n,1}}$ |
| ⋮ | ⋮ | | ⋮ | | | ⋮ | | | ⋮ | |
| $u_{Yn}$ | $Y_m$ | 0 | ... | 0 | 0 | ... | 0 | $F_{3_{1,n}}$ | ... | $F_{3_{n,m}}$ |
| $s_1$ | L | $F_{1_{1,j_1}}$ | ... | $F_{1_{n,j_1}}$ | $F_{2_{1,j_1}}$ | ... | $F_{2_{n,j_1}}$ | $F_{3_{1,j_1}}$ | ... | $F_{3_{n,j_1}}$ |
| ⋮ | ⋮ | | ⋮ | | | ⋮ | | | ⋮ | |
| $s_p$ | L | $F_{1_{1,j_p}}$ | ... | $F_{1_{n,j_p}}$ | $F_{2_{1,j_p}}$ | ... | $F_{2_{n,j_p}}$ | $F_{3_{1,j_p}}$ | ... | $F_{3_{n,j_p}}$ |
| Marginal Cost | $\sum_{i=1}^{m}(C_j+M_j+Y_j)+pL$ | $\sum_{i=1}^{m+p}F_{1_{1,j}}$ | ... | $\sum_{i=1}^{m+p}F_{1_{n,j}}$ | $\sum_{i=1}^{m+p}F_{2_{i,j}}$ | ... | $\sum_{i=1}^{m+p}F_{2_{n,j}}$ | $\sum_{i=1}^{m+p}F_{3_{i,j}}$ | ... | $\sum_{i=1}^{m+p}F_{3_{n,j}}$ |

The slack variables $s_i$'s are then added in Eq. 171.

The modified BR's algorithm may then be described in two stages. In the first stage, there are three sets of n iterations for the C, M, and Y components respectively. In each of the n iterations, the pivotal columns are restricted to $b_i$ and $c_i$. The vector entering the basis is the one with the largest nonnegative marginal cost. The vector leaving the basis is chosen from $v_j$ and $u_j$ for the one causing the maximum reduction in the objective function. The interchange of vectors leaving and entering the basis are these performed within the same color component.

In the next stage, the nonbasic $u_j$ or $v_j$ are interchanged with the basic $u_j$, $v_j$, or $s_{jl}$. Neither $b_i$ or $c_i$ is allowed to leave the basis. The criteria for selecting vectors leaving and entering the basis are the same as that in the first stage. The interchange of vectors $v_j$ and $u_j$ leaving and entering the basis may be performed within the same color component. However, $w_{jl}$ can be interchanged with the $v_j$ and $u_j$ vector for any color component. Once the vector $s_{jl}$ leaves the basis, it is generally not allowed to enter back onto the basis. The iteration stops when all the marginal costs are non-positive. Thereafter, basic vectors $b_i$ or $c_i$ may be interchanged with the corresponding nonbasic vectors $c_j$ or $b_j$.

As discussed above, the BP dual algorithm may be a relatively good algorithm for color conversion using $L_\infty$ approximation. For the color conversion with the toner/ink limitation, a constraint may be added in the problem formulation of the BP dual algorithm using the $L_\infty$ approximation.

In this regard, the $L_\infty$ errors may be defined for component of C, M and Y:

$$\xi_c = \max_{1 \leq j \leq m} \left\| \sum_{i=1}^{n+4} w_{ci} F_{ci}(z_j) - C_j \right\|_\infty \quad \text{(Eq. 172)}$$

$$\xi_m = \max_{1 \leq j \leq m} \left\| \sum_{i=1}^{n+4} w_{mi} F_{mi}(z_j) - M_j \right\|_\infty \quad \text{(Eq. 173)}$$

$$\xi_y = \max_{1 \leq j \leq m} \left\| \sum_{i=1}^{n+4} w_{yi} F_{yi}(z_j) - Y_j \right\|_\infty \quad \text{(Eq. 174)}$$

Then, the problem may be formulated in the primal form by minimizing; $\xi = \xi_c + \xi_m + \xi_y$, subject to $$\xi_c + \sum_{i=1}^{n+4} \alpha_{ci} F_{ci}(z_j) \geq C_j \quad \text{(Eq. 175)}$$

$$\xi_c - \sum_{i=1}^{n+4} \alpha_{ci} F_{ci}(z_j) \geq -C_j \quad \text{(Eq. 176)}$$

$$\xi_m + \sum_{i=1}^{n+4} \alpha_{mi} F_{mi}(z_j) \geq M_j \quad \text{(Eq. 177)}$$

$$\xi_m - \sum_{i=1}^{n+4} \alpha_{mi} F_{mi}(z_j) \geq -M_j \quad \text{(Eq. 178)}$$

$$\xi_y + \sum_{i=1}^{n+4} \alpha_{yi} F_{yi}(z_j) \geq Y_j \quad \text{(Eq. 179)}$$

$$\xi_y - \sum_{i=1}^{n+4} \alpha_{yi} F_{yi}(z_j) \geq -Y_j \quad \text{(Eq. 180)}$$

$$-\sum_{i=1}^{n+4} (\alpha_{ci} F_{ci}(z_{jl}) + \alpha_{mi} F_{mi}(z_{jl}) + \alpha_{yi} F_{yi}(z_j)) \leq -L, \quad \text{(Eq. 181)}$$

where $\xi c, \xi m, \xi y \geq 0$, $\alpha_1, \alpha_2, \ldots \alpha_{n+4}$ unrestricted, $z_j = \{L, a, b\}_j$, $j=1, 2, \ldots, m$, $J=\{jl|C_{jl}+M_{jl}+Y_{jl}>L\} \subseteq \{j=1, 2, \ldots, m\}$, and $F_j = [1, z_j, \phi_1(z_j), \phi_2(z_j), \ldots, \phi_n(z_j)]_{n+4}$.

Transformed from the primal formulation, the dual formulation is performed by maximizing $$\sum_{i=1}^{m}\left[(\underline{\sigma}_{ci}-\tau_{ci})C_i+(\underline{\sigma}_{mi}-\tau_{mi})M_i+(\underline{\sigma}_{yi}-\tau_{yi})Y_i\right]-L\sum_{i_k=1}^{p}\rho_{i_k},\quad\text{(Eq. 182)}$$

subject to $$\sum_{j=1}^{m}\left[(\underline{\sigma}_{cj}-\tau_{cj})F_{cij}^{T}-\sum_{jl=1}^{p}\rho_j F_{cij_l}^{T}\right]=0 \quad\text{(Eq. 183)}$$

$$\sum_{j=1}^{m}\left[(\underline{\sigma}_{cj}+\tau_{cj})\right]\le 1 \quad\text{(Eq. 184)}$$

$$\sum_{j=1}^{m}\left[(\underline{\sigma}_{mj}-\tau_{mj})F_{mij}^{T}-\sum_{jl=1}^{p}\rho_j F_{mij_l}^{T}\right]=0 \quad\text{(Eq. 185)}$$

$$\sum_{j=1}^{m}\left[(\underline{\sigma}_{mj}+\tau_{mj})\right]\le 1 \quad\text{(Eq. 186)}$$

$$\sum_{j=1}^{m}\left[(\underline{\sigma}_{yj}-\tau_{yj})F_{yij}^{T}-\sum_{jl=1}^{p}\rho_j F_{yij_l}^{T}\right]=0, \quad\text{(Eq. 187)}$$

$$\sum_{j=1}^{m}\left[(\underline{\sigma}_{yj}+\tau_{yj})\right]\le 1, \quad\text{(Eq. 188)}$$

and $$\underline{\sigma}_j,\tau_j,\rho_j\ge 0,\ j=1,2,\ldots,m \quad\text{(Eq. 189)}$$

where $z_j=\{L,a,b\}_j$, $j=1,2,\ldots,m$, $J=\{jl|C_{jl}+M_{jl}+Y_{jl}>L\}\subset\{1,2,\ldots,m\}$, $F_j=[1,z_j,\phi_1(z_j),\phi_2(z_j),\ldots,\phi_n(z_j)]_{n+4}$, $F_{jl}=[1,z_{jl},\phi_{jl}(z_{jl}),\phi_{j2}(z_{jl}),\ldots,\phi_n(z_{jl})]_{n+4}$, $\phi_{ij}=\phi_i(z_j)$, and p denotes the number of color data points that exceed the toner/ink limit.

A modified BP $L_\infty$ approximation algorithm may be used for solving the color conversion from CIELab to CMY with a toner/ink limitation L based on the condensed initial simplex table below.

| Basis | $s_{C_1}$ | ... $s_{C_m}$ | $s_{M_1}$ | ... $s_{M_m}$ | $s_{Y_1}$ | ... $s_{Y_m}$ | $s_{CMY_{j1}}$ | ... $s_{CMY_{jp}}$ |
|---|---|---|---|---|---|---|---|---|
| $\alpha_{C_1}$ | $F_{C_{1,1}}^T$ | ... $F_{C_{1,m}}^T$ | 0 | ... 0 | 0 | ... 0 | $F_{C_1,j1}^T$ | ... $F_{C_1,jp}^T$ |
| . | . | . | . | . | . | . | . | . |
| $\alpha_{C_n}$ | $F_{C_{n,1}}^T$ | ... $F_{C_{n,m}}^T$ | 0 | ... 0 | 0 | ... 0 | $F_{C_n,j1}^T$ | ... $F_{C_n,jp}^T$ |
| $\alpha_{M_1}$ | 0 | ... 0 | $F_{M_{1,1}}^T$ | ... $F_{M_{1,m}}^T$ | 0 | ... 0 | $F_{M_1,j1}^T$ | ... $F_{M_1,jp}^T$ |
| . | . | . | . | . | . | . | . | . |
| $\alpha_{M_n}$ | 0 | ... 0 | $F_{M_{n,1}}^T$ | ... $F_{M_{n,m}}^T$ | 0 | ... 0 | $F_{M_n,j1}^T$ | ... $F_{M_n,jp}^T$ |
| $\alpha_{Y_1}$ | 0 | ... 0 | 0 | ... 0 | $F_{Y_{1,1}}^T$ | ... $F_{Y_{1,m}}^T$ | $F_{Y_1,j1}^T$ | ... $F_{Y_1,jp}^T$ |
| . | . | . | . | . | . | . | . | . |
| $\alpha_{Y_n}$ | 0 | ... 0 | 0 | ... 0 | $F_{Y_{n,1}}^T$ | ... $F_{Y_{n,m}}^T$ | $F_{Y_n,j1}^T$ | ... $F_{Y_n,jp}^T$ |
| $w_C$ | 1 | ... 1 | 0 | ... 0 | 0 | ... 0 | 0 | ... 0 |
| $w_M$ | 0 | ... 0 | 1 | ... 1 | 0 | ... 0 | 0 | ... 0 |
| $w_Y$ | 0 | ... 0 | 0 | ... 0 | 1 | ... 1 | 0 | ... 0 |
| Marginal Cost | $-C_1$ | ... $-C_m$ | $-M_1$ | ... $-M_m$ | $-Y_1$ | ... $-Y_m$ | L | ... L |

In the first stage of the BP algorithm, the first n simplex iterations are performed. For example, the $\alpha_c$ vectors may be moved out of the basis. The vector entering the basis is selected from $s_c$ to correspond to that with the largest absolute reduced cost. The $\alpha_m$ vectors may be moved out of the basis. The vector entering the basis is selected from $s_m$ to correspond to that with the largest absolute reduced cost. The $\alpha_y$ vectors may be moved out of the basis. The vector entering the basis is selected from $s_y$ to correspond to that with the largest absolute reduced cost.

In the second stage of the BP algorithm, $\xi_c$ is forced out of the basis. The vector entering the basis is selected from the remaining nonbasic vectors $s_c$ and $\alpha_c$ is not allowed back onto the basis. $\xi_m$ is forced out of the basis. The vector entering the basis is selected from the remaining nonbasic vector $s_m$ and $\alpha_m$ is not allowed to move back onto the basis. $\xi_y$ is forced out of the basis. The vector entering the basis is selected from the remaining nonbasic vector $s_y$ and $\alpha_y$ is not allowed to move back onto the basis.

In the third stage of the BP algorithm, the pivotal column is chosen corresponding to the most negative marginal cost. The pivotal row may then be chosen by the ratio selection rule. The interchange of nonbasic vectors $s_i$ and basic vectors $s_j$ may be performed within the same color component. The iteration continues until all marginal costs corresponding to the nonbasic vectors $s_c$, $s_m$, and $s_y$ are nonnegative. The vector $s_{cmy}$ is not allowed to enter the basis.

A fourth stage is added to perform simplex iteration interchanging nonbasic vectors including all the remaining vectors $s_c$, $s_m$, $s_y$, and $s_{cmy}$ and the basic vectors in the basis. Nonbasic vectors $s_c$, $s_m$, and $s_y$ interchange with basic vectors of $s_c$, $s_m$, and $s_y$, respectively. The nonbasic vectors $s_c$, $s_m$, and $s_y$ interchange with any basic vectors of $s_c$, $s_m$, and $s_y$ ending when the marginal costs are nonnegative. The function $\phi$ thus satisfies the Haar condition as described in above.

Gamut Mapping

The inventive embodiments of out-of-gamut conversion that include CIELab to CMYK gamut conversion may be described as follows. First, the thresholds for color difference in hue angle Th and color difference in lightness TL based on the perceptual color difference tolerance are defined. Next, the output device gamut boundary gmt0 specified in the CIELab color space is defined. This boundary may be expanded into a few layers with a small increment each time (e.g., $\{gmt_i, i=1, 2, \ldots, N\}$). In each layer, the CIELab values are $\{(L, a, b)_{ij}, j=1, 2, \ldots, m_i\}$. The corresponding color in CIELch is $\{(L,c,h)_{ij}, j=1, 2, \ldots, m_i\}$, where mi is the number of the CIELab colors in the layer i. Then the CMY value is obtained using $$g_0((L,a,b)_{1j}) \to (C,M,Y)_{1j}, \quad \text{(Eq. 190)}$$

where g0 is the mapping function from CIELab to CMY based on the inside gamut colors. The CIELab data in the first expanded layer is $(L, a, b)_1 = \{(L, a, b)_{1j}, j=1, 2, \ldots, m_1\}$. The number of color data points in gmt1 is $(C, M, Y)_1 = \{(C,M,Y)_{1j}, j==1, 2, \ldots, m_1\}$, $m_1$. If any C, M, and Y component value in $(C, M, Y)1$ is smaller than 0 or greater than 1, then the value is changed to 0 or 1 respectively. The $(C, M, Y)1$ may then be changed to $(C, M, Y)'1$. $(L, a, b)'1$ is obtained using $$f_0(C_{1j}', M_{1j}', Y_{1j}'0) \to (L_{1j}', a_{1j}', b_{1j}') \quad \text{(Eq 191)}$$

where $f_0$ is the mapping function from CMYK to CIELab based on the inside gamut colors. Then $(L, a, b)'1$ to $(L, C, h)'1$ is converted and the lightness difference $(\{dL_{1j}, j=1, 2, \ldots, m_1\}$ and the hue difference $(\{dh_{1j}, j=1, 2, \ldots, m_1\}$ are calculated for each data point between $(L, C, h)_1$ and $(L, C, h)'_1$. If $dh_{1j} > T_h$ or $dL1j > T_L$, $(L, C, h)'_1$ is converted to $(L, C, h)''_1$ by making the following changes in $L'_{1j}$ and $h'_{1j}$:

$$L = \begin{cases} L_{1j} + T_L, & L'_{1j} > L_{1j} \\ L_{1j} - T_L, & L'_{1j} < L_{1j} \end{cases} \quad \text{(Eq. 192)}$$

$$h = \begin{cases} h_{1j} + T_h, & h'_{1j} > h_{1j} \\ h_{1j} - T_h, & h'_{1j} < h_{1j}. \end{cases} \quad \text{(Eq. 193)}$$

The steps may be repeated until the $(C, M, Y)_1$ values are found to meet the criteria of $T_h$ and $T_L$. Then all out-of-gamut CIELab values $(L, a, b)$, may be mapped in gmt1 with $(C, M, Y)_1$. Models of $g_1$ and $f_1$ are then generated using the data points in gmt1:

$$g_1((L,a,b)_1) \to (C,M,Y) \text{ and} \quad \text{(Eq. 194)}$$

$$f_1((C,M,Y)1) \to (L,a,b). \quad \text{(Eq. 195)}$$

Each of the above steps may then be repeated and the CIELab data interpolated in $\{gmt_i, i=2, 3, \ldots, N\}$ to find $\{(C,M,Y)_{ij}, j=1, 2, \ldots, m_i\}$. The iteration stops when the last color layer reaches optimized color ranges (e.g., as described in U.S. Pat. No. 6,719,392, the entire contents of which are incorporated by reference)

When the RBF models $f_i$ and $g_i$ are generated based on the data points in the gamut layer $gmt_i$, the data used in generating these models may contain two parts. The first part includes the data that fits the model $g_{(i-1)}$ and the data of $f_{(i-1)}$ that is generated based on the gamut layer i-1. The second part includes the data not fitting $g_{(i-1)}$ and $f_{(i-1)}$. This second part has C, M, or Y values either below 0 or above 1 using $f_{(i-1)}$ and is clipped to either 0 and 1 and refined with the thresholds $T_h$ and $T_L$.

In doing so, the models generated for each gamut layer are continuous and smooth. To summarize, the gamut mapping direction is obtained by creating the numerical model guided by a perceptual color difference model. The advantages of this technique are that more levels are obtained from this gamut mapping algorithm. Moreover, out-of-gamut colors in a close neighborhood vary continuously. The direction of the gamut mapping is not fixed, rather it varies smoothly to provide aesthetically pleasing color mappings.

Figure 6:
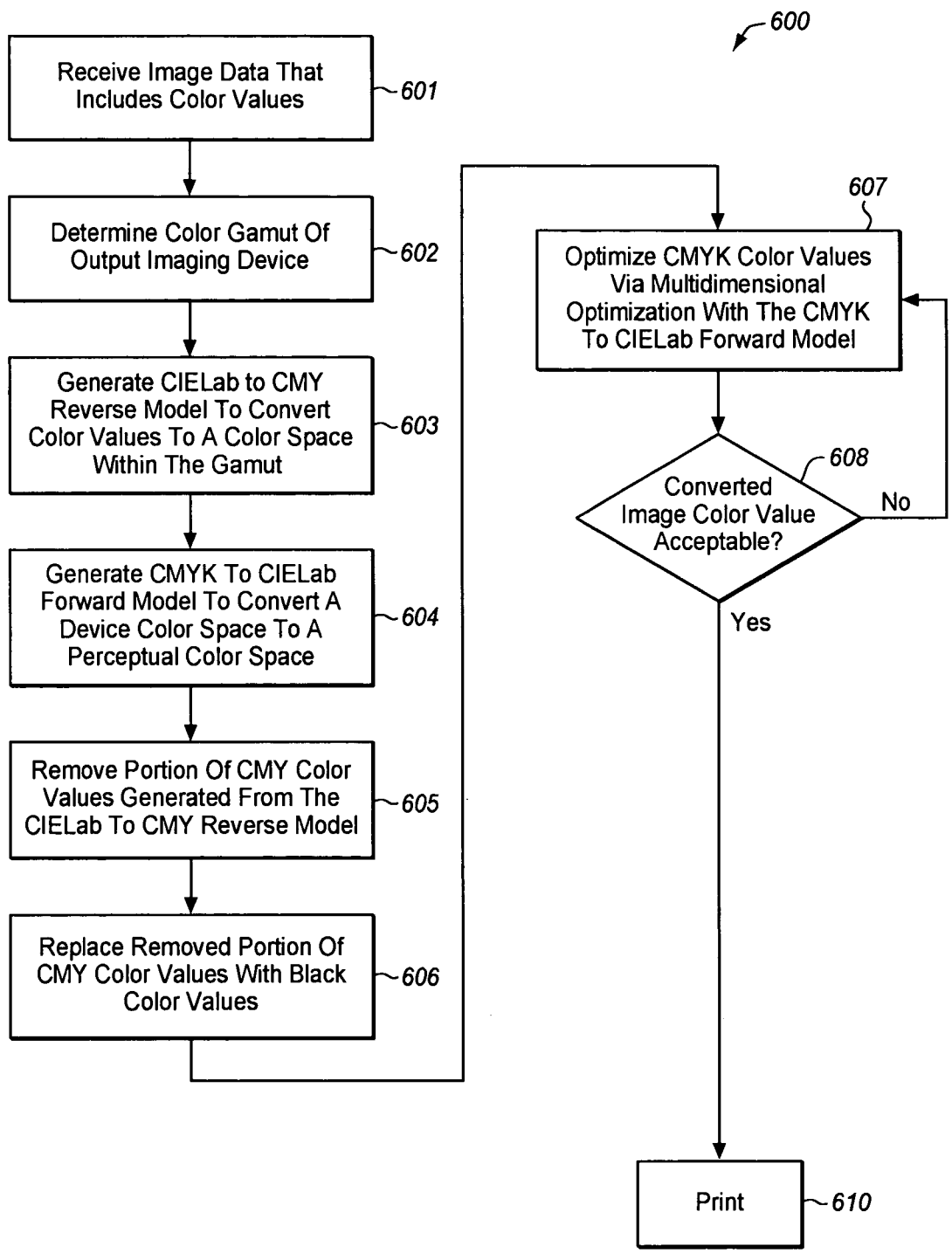
FIG. 6 is a flowchart illustrating a method of performing gray component replacement in one exemplary embodiment of the invention.

FIG. 6 is a flowchart illustrating a method 600 of performing GCR optimization in one exemplary embodiment of the invention. In this embodiment, the method 600 initiates with the modeling module 101 receiving image data that includes color values in the process element 601. Concomitantly, the modeling module 101 may determine the color gamut of an output imaging device 103 in the process element 602. For example, the modeling module 101 may determine the color gamut of a printer so that the image data may be converted thereto and printed on the tangible medium 213. To begin the conversion, the modeling module 101 may generate a CIELab to CMY reverse numerical model to convert color values of the image data to a color space within the color gamut of the output imaging device in the process element 603. The modeling module 101 may also generate a CMYK to CIELab forward numerical model to convert the device color space to a perceptual color space in the process element 604. The forward and reverse conversion models may be generated according to radial basis functions, as described above.

The optimization module 104 may then identify certain color values within the reverse numerical model that are subject to replacement. For example, the optimization module 104 may remove a portion of CMY color values generated from the CIELab to CMY reverse model in the process element 605 and replace the removed portion of CMY color values with black color values in the process element 606. Thereafter, the optimization module 104 may optimize CMYK color values via a multidimensional optimization with the CMYK to CIELab forward model in the process element 607. For example, the optimization module 104 may optimize the CMYK color values by performing Newton's method using the CMYK to CIELab forward model.

Thereafter, a determination may be made as to whether the converted image is of an acceptable quality in the process element 608. If so, the converted image may be sent to a printer or other output imaging device for display in the process element 610. Otherwise, the optimization module 104 may continue optimizing the CMYK color values in the process element 607 until the image meets the requisite level of quality.

Although specific embodiments are described herein, the scope of the invention is not limited to those specific embodiments. The scope of the invention is defined by the following claims and any equivalents thereof. For example, the GCR optimization techniques described herein may be implemented for virtually any presentation color space where desired. In the context of printing, the invention is not intended to be limited to any particular type of printer. For example, the GCR optimization described herein may be employed in either ink or toner based printers. Moreover, the GCR optimization may be employed in printers ranging in size from small household printers to large commercial printers. In one embodiment, the GCR optimization may be implemented as software instructions operable direct a processor to optimize gray component replacement in image data as needed.

We claim:

1. A method of optimizing gray component replacement in a color image, the method comprising:
   receiving a color image from an input imaging device;
   determining a color gamut of an output imaging device;
   generating a CIELab to CMY numerical model to convert the color image to a color space within the color gamut of the output imaging device;
   generating a CMYK to CIELab numerical conversion model;
   removing unequal amounts of CMY color values generated from the CIELab to CMY numerical conversion model;

replacing the removed CMY color values with black color values to establish an initial point for optimization in the CMYK to CIELab numerical conversion model; and optimizing first CMYK color values via a multidimensional optimization using the CMYK to CIELab numerical model, wherein optimizing comprises:

converting the removed CMY color values to a set of second CMYK color values;

operating on the set of second CMYK color values to generate an optimization algorithm; and optimizing the first CMYK color values via the optimization algorithm.

2. The method of claim 1, wherein the optimization algorithm comprises Newton's method.

3. The method of claim 1, wherein generating the CIELab to CMY numerical conversion model comprises computing the CIELab to CMY numerical conversion model according to a radial basis function.

4. The method of claim 1, wherein generating the CMYK to CIELab numerical model comprises computing the CMYK to CIELab numerical model according to a radial basis function.

5. A system for optimizing gray component replacement in a color image, the system comprising:

a modeling module operable to receive a color image from an input imaging device, determine a color gamut of an output imaging device, generate a CIELab to CMY numerical model to convert the color image to a color space within the color gamut of the output imaging device, and generate a CMYK to CIELab numerical conversion model; and an optimization module operable to remove unequal amounts of CMY color values generated from the CIELab to CMY numerical conversion model, replace the removed CMY color values with black color values to establish an initial point for optimization in the CMYK to CIELab numerical conversion model, and optimize first CMYK color values via a multidimensional optimization using the CMYK to CIELab numerical model wherein the optimization module is further operable to convert the removed CMY color values to a set of second CMYK color values, operate on the set of second CMYK color values to generate an optimization algorithm, and optimize the first CMYK color values via the optimization algorithm.

6. The system of claim 5, wherein the optimization module is further operable to optimize the CMYK color values via Newton's method using the CMYK to CIELab numerical model.

7. The system of claim 5, wherein the modeling module is operable to generate the CIELab to CMY numerical conversion model according to a radial basis function.

8. The system of claim 5, wherein the modeling module is operable to generate the CMYK to CIELab numerical model according to a radial basis function.

9. A printing system, comprising:

a printer operable to print to a tangible medium; and a printer controller operable to process a print job including a color image from a host system and transfer the processed print job to the printer, wherein the printer controller comprises:

a modeling module operable to determine a color gamut of the printer, generate a CIELab to CMY numerical model to convert the color image to a color space within the color gamut of the printer, and generate a CMYK to CIELab numerical conversion model; and an optimization module operable to remove unequal amounts of CMY color values generated from the CIELab to CMY numerical conversion model, replace the removed CMY color values with black color values to establish an initial point for optimization in the CMYK to CIELab numerical conversion model, and optimize first CMYK color values via a multidimensional optimization using the CMYK to CIELab numerical model prior to printing via the printer, wherein the optimization module is further operable to convert the removed CMY color values to a set of second CMYK color values, operate on the set of second CMYK color values to generate an optimization algorithm, optimize the first CMYK color values via the optimization algorithm, and prepare the print job for printing via the printer.

* * * * *